United States Patent
Zhou

(10) Patent No.: US 9,385,634 B2
(45) Date of Patent: Jul. 5, 2016

(54) ROTATIONAL TYPE OF MEMS ELECTROSTATIC ACTUATOR

(71) Applicant: Tiansheng Zhou, Edmonton (CA)

(72) Inventor: Tiansheng Zhou, Edmonton (CA)

( * ) Notice: Subject to any disclaimer, the term of this patent is extended or adjusted under 35 U.S.C. 154(b) by 193 days.

(21) Appl. No.: 13/750,413

(22) Filed: Jan. 25, 2013

(65) Prior Publication Data

US 2013/0194649 A1     Aug. 1, 2013

Related U.S. Application Data

(60) Provisional application No. 61/632,535, filed on Jan. 26, 2012.

(51) Int. Cl.
| | |
|---|---|
| *H02N 1/00* | (2006.01) |
| *H01G 7/06* | (2006.01) |
| *G02B 26/02* | (2006.01) |
| *H01G 5/18* | (2006.01) |

(52) U.S. Cl.
CPC .............. *H02N 1/002* (2013.01); *G02B 26/02* (2013.01); *G02B 26/023* (2013.01); *H01G 5/18* (2013.01); *H01G 7/06* (2013.01)

(58) Field of Classification Search
CPC ........... G02B 26/0833; G02B 26/0841; G02B 26/085; G02B 26/0858; G02B 26/0866; B81B 2201/034
See application file for complete search history.

(56) References Cited

U.S. PATENT DOCUMENTS

| | | |
|---|---|---|
| 4,772,786 A | 9/1988 | Langdon |
| 5,083,857 A | 1/1992 | Hornbeck |
| 5,146,435 A | 9/1992 | Bernstein |
| 5,202,785 A | 4/1993 | Nelson |
| 5,212,582 A | 5/1993 | Nelson |
| 5,233,456 A | 8/1993 | Nelson |
| 5,408,731 A | 4/1995 | Berggvist et al. |
| 5,452,268 A | 9/1995 | Bernstein |
| 5,490,220 A | 2/1996 | Loeppert |
| 5,583,688 A | 12/1996 | Hornbeck |
| 5,734,492 A | 3/1998 | Chung |
| 5,735,026 A | 4/1998 | Min |
| 5,739,941 A | 4/1998 | Knipe et al. |

(Continued)

FOREIGN PATENT DOCUMENTS

| | | |
|---|---|---|
| CA | 2584571 A1 | 10/2007 |
| EP | 1292171 A2 | 3/2003 |

(Continued)

*Primary Examiner* — Scott J Sugarman
*Assistant Examiner* — Robert E Tallman
(74) *Attorney, Agent, or Firm* — Davis & Bujold PLLC; Michael J. Bujold

(57) ABSTRACT

A cantilever type of electrostatic vertical combdrive actuators may generate larger actuator displacement (typically over 70 um) with a relatively small and simple structure. The actuation voltage is lower while the actuation movement is robust without any typical sideway finger snapping phenomena due to a cantilever type of structure. Because of its small form factor, it can form a high fill factor array in applications such as lower power consumption display devices, sensitive electromagnetic radiation detector/detector arrays, etc. The MEMS (Micro-Electro-Mechanical Systems) electrostatic rotational actuators may have wide applications such as in optical shutter, optical chopper, optical switches, optical attenuators, optical tunable filter, RF shunt switch, RF ohmic contact switch, RF MEMS variable capacitors, MEMS display and sensitive electromagnetic radiation detector etc.

39 Claims, 17 Drawing Sheets

(56) References Cited

U.S. PATENT DOCUMENTS

| | | | |
|---|---|---|---|
| 5,760,947 A | 6/1998 | Kim et al. | |
| 5,870,482 A | 2/1999 | Loeppert et al. | |
| 6,012,335 A | 1/2000 | Bashir et al. | |
| 6,028,690 A | 2/2000 | Carter et al. | |
| 6,046,840 A | 4/2000 | Huibers | |
| 6,064,630 A | 5/2000 | Fersht et al. | |
| 6,078,016 A * | 6/2000 | Yoshikawa et al. | 200/181 |
| 6,204,080 B1 | 3/2001 | Hwang | |
| 6,272,926 B1 | 8/2001 | Fehrenbach et al. | |
| 6,275,320 B1 | 8/2001 | Dhuler et al. | |
| 6,333,584 B1 * | 12/2001 | Jerman et al. | 310/309 |
| 6,459,845 B1 | 10/2002 | Lee et al. | |
| 6,522,762 B1 | 2/2003 | Mullenborn et al. | |
| 6,535,460 B2 | 3/2003 | Loeppert et al. | |
| 6,552,469 B1 | 4/2003 | Pederson et al. | |
| 6,577,785 B1 * | 6/2003 | Spahn et al. | 385/22 |
| 6,581,465 B1 | 6/2003 | Waters et al. | |
| 6,628,856 B1 | 9/2003 | Costello et al. | |
| 6,654,473 B2 | 11/2003 | Collins | |
| 6,694,073 B2 | 2/2004 | Golub et al. | |
| 6,701,039 B2 * | 3/2004 | Bourgeois et al. | 385/22 |
| 6,732,588 B1 | 5/2004 | Mullenborn et al. | |
| 6,744,173 B2 | 6/2004 | Behin et al. | |
| 6,751,395 B1 | 6/2004 | Novotny et al. | |
| 6,758,983 B2 | 7/2004 | Conant et al. | |
| 6,760,145 B1 | 7/2004 | Taylor et al. | |
| 6,763,116 B2 | 7/2004 | Barthel et al. | |
| 6,775,048 B1 | 8/2004 | Starkweather et al. | |
| 6,778,728 B2 | 8/2004 | Taylor et al. | |
| 6,780,180 B1 | 8/2004 | Goble et al. | |
| 6,780,185 B2 | 8/2004 | Frei et al. | |
| 6,781,231 B2 | 8/2004 | Minervini | |
| 6,781,744 B1 | 8/2004 | Aksyuk et al. | |
| 6,794,217 B2 | 9/2004 | Lee et al. | |
| 6,816,295 B2 | 11/2004 | Hong et al. | |
| 6,822,776 B2 | 11/2004 | Hah et al. | |
| 6,829,131 B1 | 12/2004 | Loeb et al. | |
| 6,829,814 B1 | 12/2004 | Freeman et al. | |
| 6,838,738 B1 | 1/2005 | Costello et al. | |
| 6,847,090 B2 | 1/2005 | Loeppert | |
| 6,859,542 B2 | 2/2005 | Johannsen et al. | |
| 6,876,810 B2 | 4/2005 | Morimoto et al. | |
| 6,881,649 B2 | 4/2005 | Kouma et al. | |
| 6,901,204 B2 | 5/2005 | Hong et al. | |
| 6,914,711 B2 | 7/2005 | Novotny et al. | |
| 6,915,061 B2 | 7/2005 | Li et al. | |
| 6,934,439 B2 | 8/2005 | Mala et al. | |
| 6,936,524 B2 | 8/2005 | Zhu et al. | |
| 6,954,579 B2 | 10/2005 | Hsu | |
| 6,963,679 B1 | 11/2005 | Novotny et al. | |
| 6,965,468 B2 | 11/2005 | Huibers et al. | |
| 6,968,101 B2 | 11/2005 | Miller et al. | |
| 6,969,635 B2 | 11/2005 | Patel et al. | |
| 6,970,281 B2 | 11/2005 | Huibers et al. | |
| 6,972,891 B2 | 12/2005 | Patel et al. | |
| 6,980,347 B2 | 12/2005 | Patel et al. | |
| 6,980,727 B1 | 12/2005 | Lin et al. | |
| 6,985,277 B2 | 1/2006 | Huibers et al. | |
| 6,996,306 B2 | 2/2006 | Chen et al. | |
| 7,010,188 B2 | 3/2006 | Miller et al. | |
| 7,023,066 B2 | 4/2006 | Lee et al. | |
| 7,051,590 B1 | 5/2006 | Lemkin et al. | |
| 7,053,981 B2 | 5/2006 | Bleeker | |
| 7,071,109 B2 | 7/2006 | Novotny et al. | |
| 7,091,057 B2 | 8/2006 | Gan et al. | |
| 7,095,546 B2 | 8/2006 | Mala et al. | |
| 7,110,635 B2 | 9/2006 | Miller et al. | |
| 7,114,397 B2 | 10/2006 | Fortin et al. | |
| 7,129,617 B2 | 10/2006 | Hong | |
| 7,134,179 B2 | 11/2006 | Freeman et al. | |
| 7,154,173 B2 | 12/2006 | Ikeda et al. | |
| 7,177,063 B2 | 2/2007 | Krylov et al. | |
| 7,209,274 B2 | 4/2007 | Van Drieenhuizen et al. | |
| 7,224,097 B2 | 5/2007 | Obi et al. | |
| 7,296,476 B2 | 11/2007 | Fortin et al. | |
| 7,305,889 B2 | 12/2007 | Fortin et al. | |
| 7,386,201 B1 | 6/2008 | DiRuscio et al. | |
| 7,535,620 B2 | 5/2009 | Zhou | |
| 7,734,127 B2 | 6/2010 | Korevaar et al. | |
| 7,863,799 B1 | 1/2011 | Godil | |
| 7,911,672 B2 | 3/2011 | Zhou | |
| 7,982,361 B2 * | 7/2011 | Maeda | B81B 3/0037 310/309 |
| 7,986,073 B2 | 7/2011 | Godil | |
| 8,238,018 B2 | 8/2012 | Zhou | |
| 2001/0050801 A1 | 12/2001 | Behin et al. | |
| 2002/0106828 A1 | 8/2002 | Loeppert | |
| 2004/0046111 A1 | 3/2004 | Swierkowski | |
| 2004/0085606 A1 | 5/2004 | Valette | |
| 2005/0061770 A1 | 3/2005 | Neumann et al. | |
| 2005/0101047 A1 | 5/2005 | Freeman et al. | |
| 2005/0264131 A1 * | 12/2005 | Hong | 310/309 |
| 2005/0280883 A1 | 12/2005 | Seo et al. | |
| 2006/0008089 A1 | 1/2006 | Willems | |
| 2006/0082251 A1 | 4/2006 | He et al. | |
| 2006/0093170 A1 | 5/2006 | Zhe et al. | |
| 2006/0093171 A1 | 5/2006 | Zhe et al. | |
| 2006/0210238 A1 | 9/2006 | Ma et al. | |
| 2007/0236775 A1 | 10/2007 | Miller et al. | |
| 2007/0284964 A1 | 12/2007 | Chung et al. | |
| 2008/0272447 A1 | 11/2008 | Sassolini et al. | |
| 2009/0180169 A1 | 7/2009 | Moidu et al. | |
| 2010/0103494 A1 | 4/2010 | Moidu | |
| 2010/0237737 A1 | 9/2010 | He et al. | |
| 2012/0018898 A1 | 1/2012 | Ebefors et al. | |

FOREIGN PATENT DOCUMENTS

| | | |
|---|---|---|
| FR | 861432 A | 2/1941 |
| FR | 2689479 A1 | 10/1993 |
| GB | 150052 A | 8/1920 |
| GB | 245654 A | 1/1926 |
| GB | 467264 A | 6/1937 |
| JP | S59230872 A | 12/1984 |
| JP | S608169 A | 1/1985 |
| JP | S6092176 A | 5/1985 |
| WO | 2004105428 A1 | 12/2004 |

* cited by examiner

Detail A

ROTATIONAL TYPE OF MEMS ELECTROSTATIC ACTUATOR

TECHNICAL FIELD

This relates to designs for a MEMS (Micro-Electro-Mechanical systems) electrostatic rotational actuator used for MEMS RF variable capacitor, MEMS RF ohmic contact switch, MEMS optical shutter/chopper, MEMS variable optical attenuator (VOA), MEMS display panel and photo diode detection array, spectrometer, atomic clock chip, printer and scanner and the like.

BACKGROUND

The MEMS (Micro-Electro-Mechanical Systems) electrostatic rotational actuators have wide applications such as in optical shutter, optical chopper, optical switches, optical attenuators, optical tunable filter, RF shunt switch, RF ohmic contact switch, RF MEMS variable capacitors and MEMS display panel and photo diode detection array, spectrometer, printer and scanner etc.

U.S. Pat. Nos. 6,275,320, 6,775,048 disclosed the MEMS variable optical attenuator/optical modulator using a thermal actuator, which consumes significant electrical power and generate over 600 degree Celsius on the silicon expansion beams; U.S. Pat. Nos. 6,751,395, 6,816,295, 6,996,306 and 7,129,617 disclosed the MEMS variable optical attenuator/switch using an electrostatic actuator, which can only generate very limited actuator displacement.

SUMMARY

According to an aspect, there is disclosed a cantilever type of electrostatic vertical combdrive actuators to generate larger actuator displacement (typically over 70 um) with a very small and simple structure. The actuation voltage is lower while the actuation movement is very robust without any typical sideway finger snapping phenomena due to a cantilever type of structure. Because of its small form factor, it can form a high fill factor array for applications of the lower power consumption display devices, or sensitive electromagnetic radiation detector/detector arrays, spectrometer, atomic clock chip, imaging, printer and scanner.

In certain aspects, the MEMS (Micro-Electro-Mechanical Systems) electrostatic rotational actuators have wide applications such as in optical shutter, optical chopper, atomic clock chip, optical switches, optical attenuators, optical tunable filter, RF shunt switch, RF ohmic contact switch, RF MEMS variable capacitors, MEMS display panel and sensitive electromagnetic radiation detector etc. Due to its small form factor, it can form a high fill factor array for applications of the lower power consumption display devices, or sensitive electromagnetic radiation detector/detector arrays, spectrometer, atomic clock chip, printer and scanner.

According to an aspect, there is provided a MEMS actuator, comprising a combdrive carried by a substrate, the combdrive having a fixed comb and a movable comb, each of the fixed comb and the movable comb having comb fingers, the fixed comb being immovably carried by the substrate. A resilient body is attached between an anchor point on the substrate and the movable comb, the resilient body permitting cantilevered, pivotal movement of the movable comb parallel to a plane defined by the comb fingers of the fixed comb in response to an actuating voltage applied to the combdrive, the comb fingers of the fixed and movable combs being curved in the direction of the movement.

In another aspect, the fixed comb and the movable comb are electrically isolated.

In another aspect, the movable comb moves toward the fixed comb in response to the actuating voltage.

In another aspect, the movable comb is attached to the resilient body by a carrier body.

In another aspect, the combdrive comprises a plurality of movable combs and fixed combs.

In another aspect, there are movable combs on opposed sides of a carrier body attached to the resilient body, the opposed movable combs permitting pivotal movement of the movable combs selectively in opposed directions.

In another aspect, there are movable combs on the same side of a carrier body attached to the resilient body.

In another aspect, the MEMS actuator further comprises at least one contact point on the substrate and the movable comb carries an electrically conductive connector, the movement of the movable comb controlling the connection of the at least one contact point and the connector. There may be more than one contact point, and the connector acting as a switch between the contact points. The connector may be mounted toward the anchor point relative to the movable comb. The connector may be electrically isolated from the movable comb and the resilient body.

In another aspect, the movable comb carries a shutter, the shutter preventing transmission of some or all wavelengths in a beam of light, the movable comb controlling the position of the shutter within the beam of light. The shutter may comprise a profiled edge. The shutter may be attached at an end of the movable comb. The shutter may be mounted across at least a portion of the comb fingers of the movable comb. The substrate may comprise an aperture, the beam of light passing through the aperture.

In another aspect, the resilient body comprises a beam structure.

In another aspect, the resilient body comprises a double beam structure. Each beam may be electrically isolated from the other and electrically connected to separate anchor points to form a circuit through the resilient body between the anchor points. The circuit may be connected to a filament carried by the movable comb.

In another aspect, the MEMS actuator further comprises a counterweight opposite the movable comb relative to the anchor point. The counterweight may comprise one or more movable combs.

In another aspect, the spacing of the comb fingers of the movable comb within the comb fingers of the fixed comb is scaled to balance the applied electrostatic forces as the movable comb moves.

In another aspect, the curvature of the fingers follows the trajectory of the movable comb when an electrostatic force is applied.

In another aspect, the resilient body supports the movable comb in a cantilever design.

In another aspect, the resilient body comprises a first part attached between a first anchor and a first side of the movable comb and a second part attached between a second anchor and a second side of the movable comb, such that the movable comb is supported by the resilient body between the first anchor and the second anchor. Each of the first and second parts of the resilient body may comprise a pair of beams, the beams being one of parallel or converging toward the movable comb from the respective anchor. The first part and the second part may be symmetrical about the movable comb.

According to an aspect, there is provided a variable capacitor, comprising a combdrive carried by a substrate, the combdrive having a first electrode comprising a fixed comb and a second electrode comprising a movable comb, each of the fixed comb and the movable comb having comb fingers, the fixed comb being immovably carried by the substrate. A resilient body is attached between an anchor point on the substrate and the movable comb, the resilient body permitting cantilevered, pivotal movement of the movable comb parallel to a plane defined by the comb fingers of the fixed comb, wherein an actuating voltage moves the movable comb relative to the fixed comb, the comb fingers of the fixed and movable combs being curved in the direction of the movement the combdrive having a capacitance that increases as the overlap of the comb fingers of the fixed comb and the movable comb increases.

In another aspect, in a disengaged position, the combdrive comprises a space between the comb fingers of the movable comb and the comb fingers of the fixed comb.

In another aspect, the combdrive comprises a first combdrive, and further comprising a second combdrive that rotates the resilient body in a direction opposite the first combdrive.

In another aspect, the combdrive comprises a first combdrive, and further comprising at least one second combdrive that rotates the resilient body in the same direction as the first combdrive.

In another aspect, the variable capacitor is connected in series or in parallel with a plurality of variable capacitors mounted to a common substrate.

In another aspect, the position of the movable comb and the capacitance of the combdrive is related to the actuating voltage applied to the combdrive.

According to an aspect, there is provided an array of MEMS actuators mounted to a substrate, each MEMS actuator comprising a combdrive carried by a substrate, the combdrive having a fixed comb and a movable comb, each of the fixed comb and the movable comb having comb fingers, the fixed comb being immovably carried by the substrate. A resilient body is attached between an anchor point on the substrate and the movable comb, the resilient body permitting cantilevered, pivotal movement of the movable comb parallel to a plane defined by the comb fingers of the fixed comb in response to an actuating voltage, the comb fingers of the fixed and movable combs being curved in the direction of the movement.

In another aspect, the substrate comprises apertures for beams of light, the movable combs carrying shutters that control passage of light through the apertures. The substrate may be a waveguide plate. The actuating voltage may comprise a periodic voltage having a frequency.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
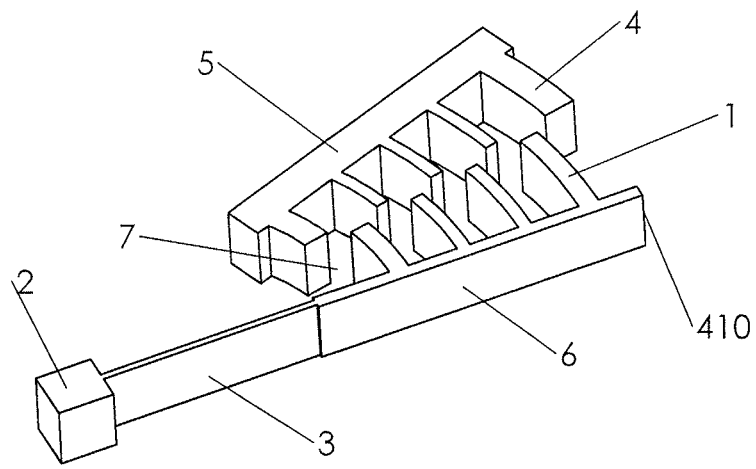
FIG. 1 is a perspective view of a MEMS RF variable capacitor.

The designs discussed herein are capable of taking different forms. However, there are shown in the drawings and will herein be described in detail preferred embodiments, with the understanding that the present disclosure is to be considered as an exemplification of the principles of the device and is not intended to limit the broad aspects of the device or design to the embodiments illustrated. The figures are not necessarily drawn to scale and relative sizes of various elements in the structures may be different than in an actual device.

MEMS RF variable capacitor is a very important component for RF networks. The capacitance of the capacitor is varied with the applied control voltage. Single capacitors or an array of such variable capacitors are used in the RF networks to tune the RF circuit performance. FIG. 1 shows an example of a MEMS RF variable capacitor. The moveable combdrive fingers 1 and fixed combdrive fingers 4 form a variable capacitor. The movable combdrive fingers 1 are connected to the anchor 2 by a resilient beam or body 3, which may be referred to herein as a flexible hinge. The hinge is shown as a straight beam shape in FIG. 1, but it could be any shapes such as serpentine shape, double straight beam shapes, etc. The fixed combdrive fingers 4 are anchored by a support beam 5 to form the one capacitor electrode, while carrier body such as the supporting beam 6 of the moveable combdrive fingers 1 forms the other capacitor electrode. The movable comb fingers 1, anchor 2, hinge 3, fixed comb fingers 4, comb finger supporting beams 5 and 6 could be made from electrical conductive silicon or other electrical conductive materials such as polysilicon, metal or metal alloy etc.

Figure 2:
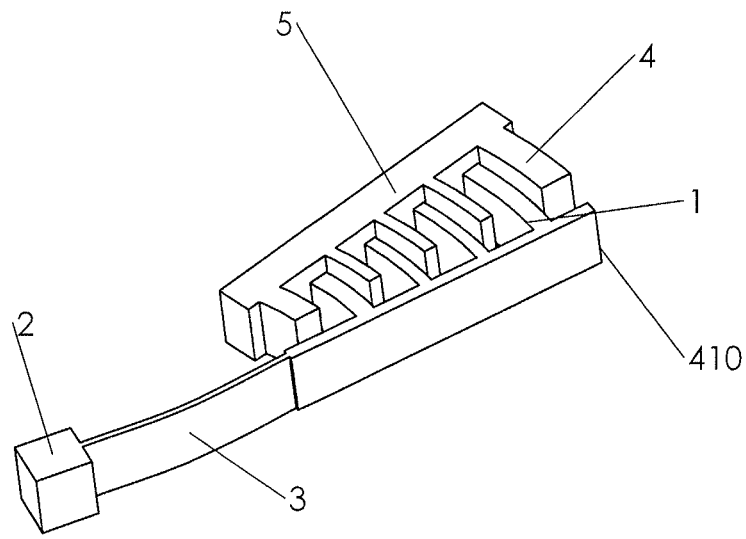
FIG. 2 is a perspective view of a MEMS RF variable capacitor.
Figure 3:
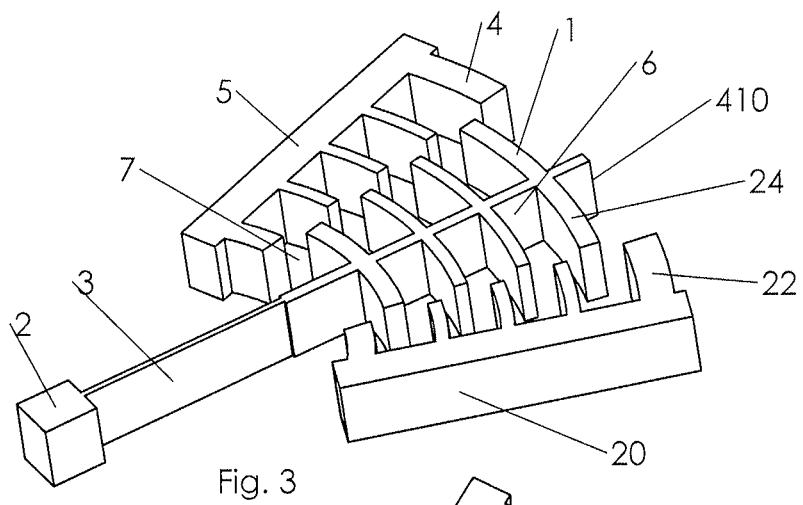
FIG. 3 is a perspective view of a MEMS RF variable capacitor.

In the initial state, the air gap 7 between the movable and fixed combdrive fingers is to reduce the initial electrical fringe effect between the tips of fixed and movable comb fingers 4 and 1 and to achieve as small as possible initial capacitance $C_i$ between moveable and fixed combdrive fingers 1 and 4. When an actuation voltage is applied between the anchor 2 and fixed part 5, the electrostatic attraction force between fingers 1 and fingers 4 is established, which will result in the deformation of the hinge 3. Therefore, the fixed combdrive fingers 4 and moveable combdrive fingers 1 will be engaged shown in FIG. 2. The engaged moveable fingers 1 and fixed combdrive fingers 4 form a capacitance $C_o$. The larger the actuation voltage, the more engagement between fixed and movable fingers, and the larger the ratio between $C_o$ and $C_i$. The structure shown in FIGS. 1 and 2 is also an electrostatic actuator. As shown, the fixed comb fingers 4 define a plane that includes the hinge 4, and the movement of fixed comb fingers 4 is in this plane. FIG. 3 shows another embodiment of the MEMS RF variable capacitor design. In order to further increase the gap 7, reduce the electrical fringe effect between the tips of fixed and movable comb fingers 4 and 1 and to achieve as small as possible initial capacitance $C_i$ between moveable comb fingers 1 and fixed combdrive fingers 4 another fixed combdrive fingers 22 connected to the supporting beam 20 is used.

Figure 4:
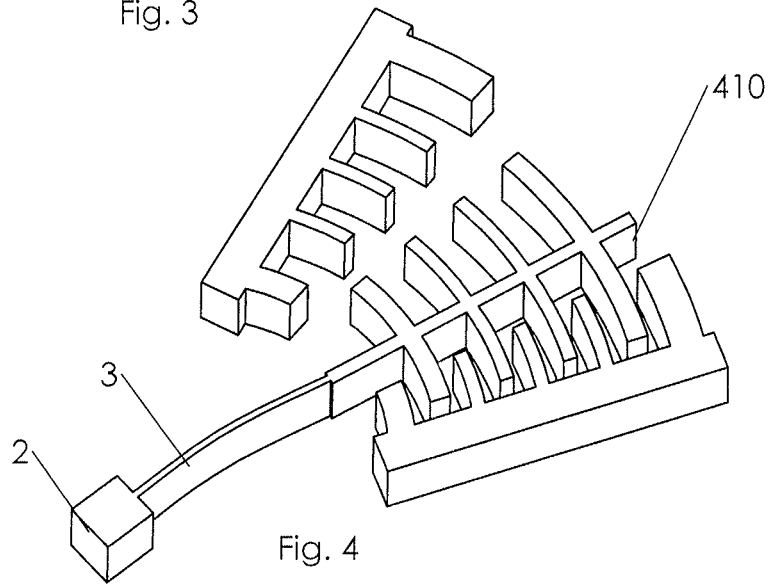
FIG. 4 is a perspective view of a MEMS RF variable capacitor.

In the initial state (FIG. 4), an actuation voltage A is applied between the anchor 2 and fixed finger supporting beam 20, the electrostatic attraction force is established, which will result in the deformation of the hinge 3. Therefore, the movable fingers 24 will move towards the fixed comb fingers 22, while the movable comb fingers 1 are moving further away from the fixed comb fingers 4. The air gap 7 between the movable comb fingers 1 and the fixed combdrive fingers 4 is further increasing while the electrical fringe effect between the tips of fixed comb fingers 4 and movable comb fingers 1 is further reduced. Therefore the initial capacitance $C_i$ between moveable fingers 1 and fixed combdrive fingers 4 is further reduced. The higher the actuation voltage A, the smaller the initial capacitance $C_i$.

Figure 5:
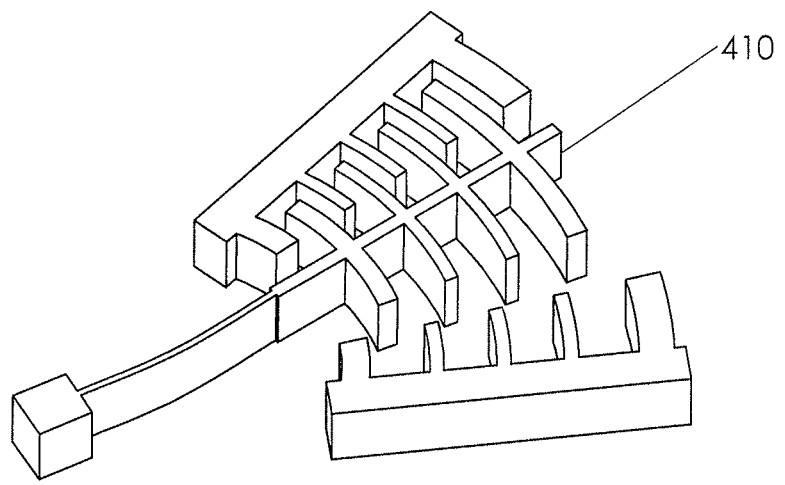
FIG. 5 is a perspective view of a MEMS RF variable capacitor.

When an actuation voltage B is applied and gradually increased between the anchor 2 and fixed finger supporting beam 5 while the voltage A between the anchor 2 and fixed finger supporting beam 20 is gradually reduced to zero volt, the electrostatic attraction force is gradually increased between the fixed comb fingers 4 and movable comb fingers 1, while the electrostatic attraction force between fixed comb fingers 22 and movable comb fingers 24 is gradually reduced. Therefore, the movable fingers 1 will move towards the fixed comb fingers 4 (FIG. 5), while the movable comb fingers 24 are moving further away from the fixed comb fingers 22. The air gap 7 between the movable comb fingers 1 and the fixed combdrive fingers 4 is further decreased while the electrical fringe effect between the tips of fixed comb fingers 4 and movable comb fingers 1 is further increased. Therefore the capacitance $C_o$ between moveable fingers 1 and fixed combdrive fingers 4 is further increased. The higher the actuation voltage B, and the less the voltage A, the larger the capacitance $C_o$.

Figure 6:
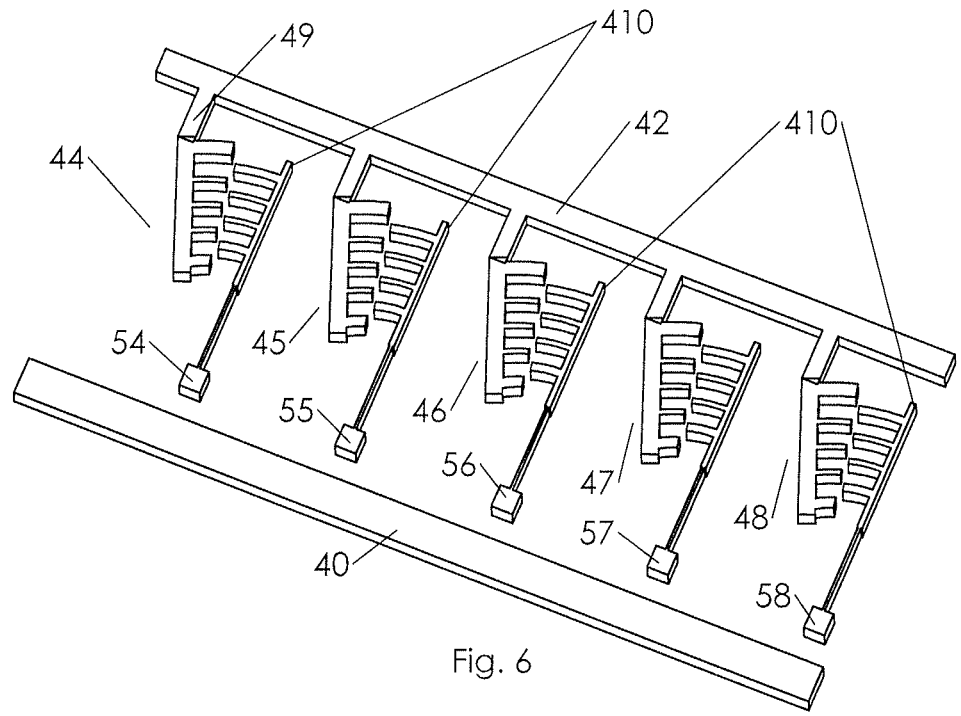
FIG. 6 is a perspective view of an array of MEMS RF variable capacitor.
Figure 7:
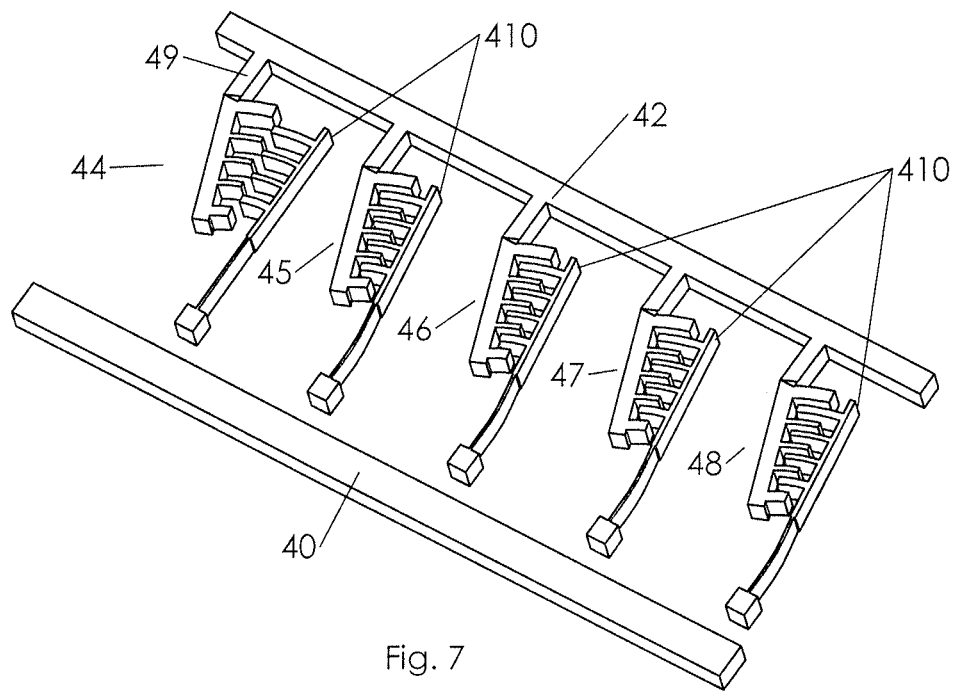
FIG. 7 is a perspective view of an array of MEMS RF variable capacitor.

FIG. 6 shows an array/bank of the single variable capacitor shown in FIG. 1, the electrical ground line 42 is connected to supporting beams of the fixed combdrive fingers of MEMS RF variable capacitor 44, 45, 46, 47 and 48 via connection structure 49. The RF signal line 40 will connect with anchors 54, 55, 56, 57 and 58 of the MEMS RF variable capacitor 44, 45, 46, 47 and 48 via an electrical structure (not shown in the FIG. 6). FIG. 6 shows the initial state of the MEMS RF variable capacitor 44, 45, 46, 47 and 48. FIG. 7 shows the not actuated MEMS RF variable capacitor 44 and actuated MEMS RF variable capacitor 45, 46, 47 and 48.

Figure 8:
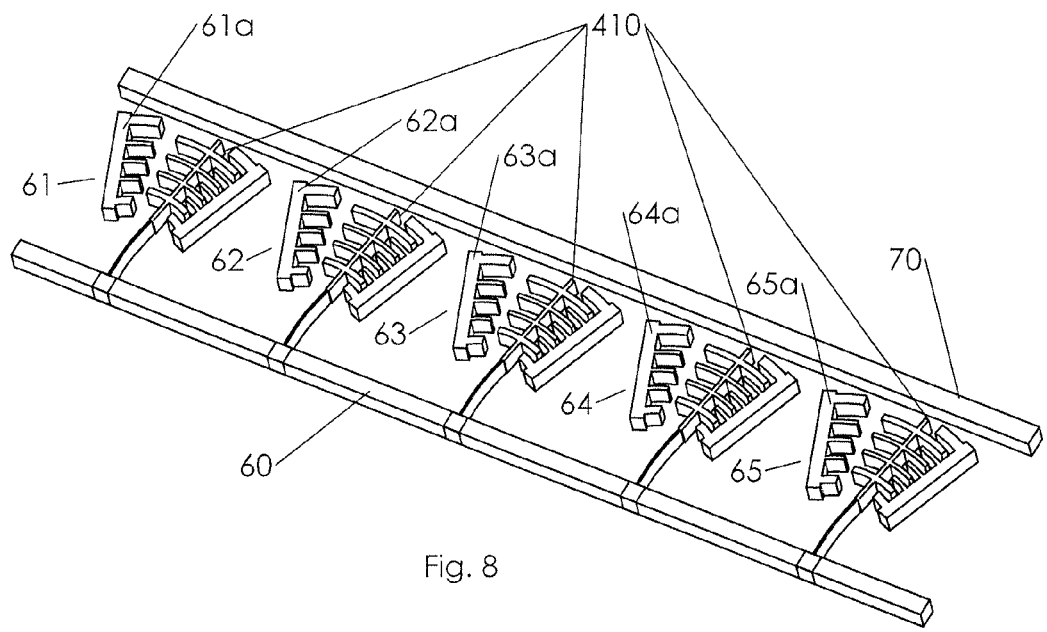
FIG. 8 is a perspective view of an array of MEMS RF variable capacitor.
Figure 9:
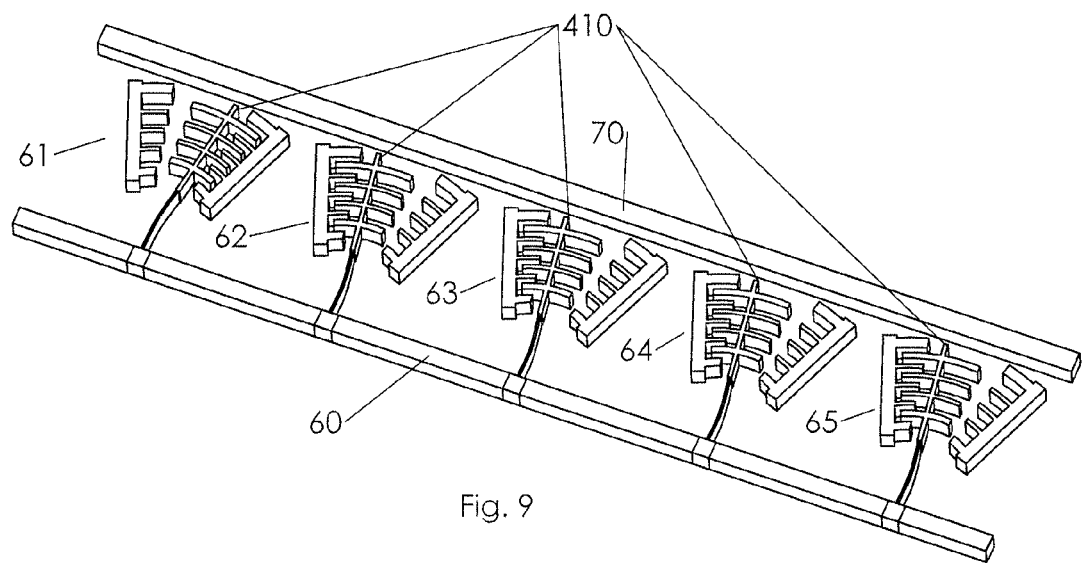
FIG. 9 is a perspective view of array of MEMS RF variable capacitor.

FIG. 8 shows an array/bank of the single variable capacitor shown in FIG. 3, the electrical ground line 60 is connected to the anchors of MEMS RF variable capacitor 61, 62, 63, 64 and 65. The RF signal line 70 will connect with the supporting beams 61a, 62a, 63a, 64a and 65A of the MEMS RF variable capacitor 61, 62, 63, 64 and 65 via an electrical structure (not shown in the FIGS. 8 and 9). FIG. 8 shows the initial state of the MEMS RF variable capacitor 61, 62, 63, 64 and 65. FIG. 9 shows the not actuated MEMS RF variable capacitor 61, and actuated MEMS RF variable capacitor 62, 63, 64 and 65.

Figure 10:
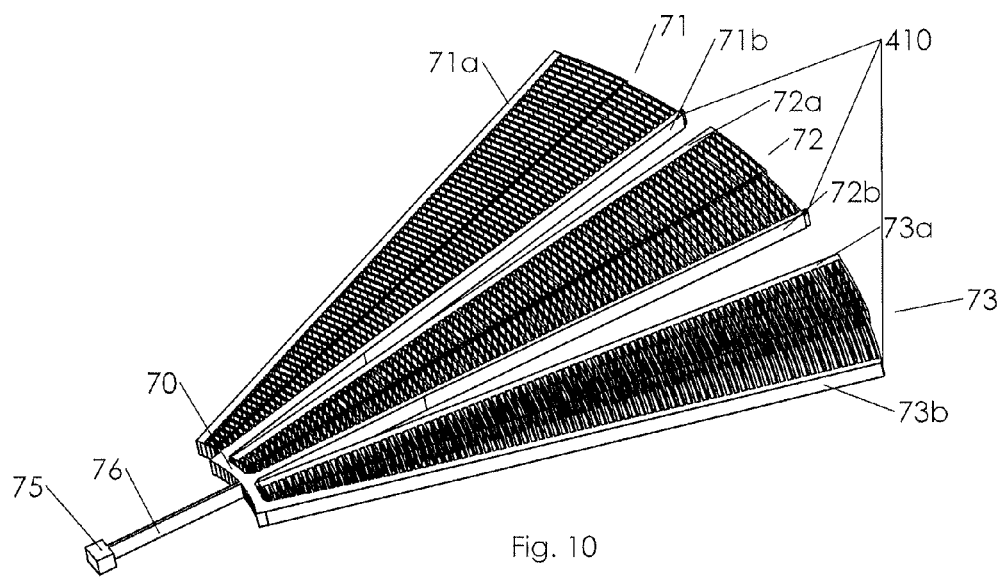
FIG. 10 is a perspective view of multiple combdrive actuators for MEMS RF variable capacitor.

In order to increase the capacitance of the MEMS RF variable capacitor, more capacitor structures are used. FIG. 10 shows three single variable capacitors 71, 72 and 73 working together. The 71a, 72a and 73a are the fixed combdrive fingers of variable capacitors 71, 72 and 73 respectively, while the 71b, 72b and 73b are the moveable combdrive fingers of variable capacitors 71, 72 and 73 respectively. The 71b, 72b and 73b with their supporting beams are connected by connection beam 70 and hinge 76 to the anchor 75.

MEMS RF ohmic contact switch is another importance component. The challenge for the successes of the MEMS RF ohmic contact switch has been the higher mechanical restoring force to overcome the stiction force, higher contact force to reduce the electrical resistance etc.

Figure 11:
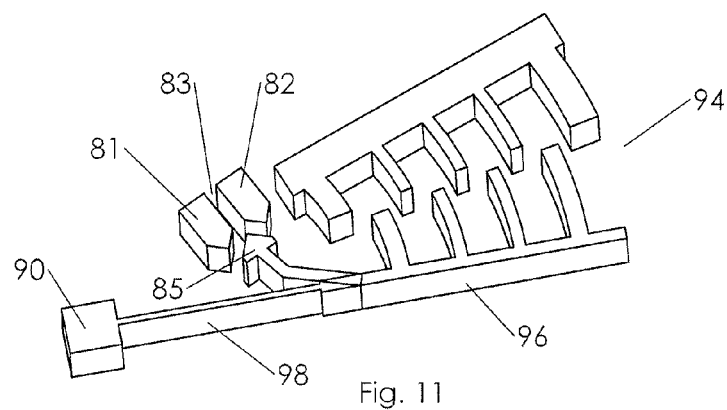
FIG. 11 is a perspective view of MEMS RF ohmic contact switch.

FIG. 11 shows the embodiment of MEMS RF ohmic contact switch. The switch contact point 81 and contact point 82 are separated with gap 83. The switch contact points 81 and 82 are either formed by thick metal or metal alloy film, or silicon structure coated with thick metal film such as metal gold, or other metal film or metal alloy film etc.

The switch connection 85 is either formed by thick metal or metal alloy film, or silicon structure coated with thick metal film such as metal gold, other metal film or metal alloy film etc. The switch connection 85 is mechanically connected to the lower part of the carrier body, such as the supporting beam 96 of the moveable combdrive actuator 94. The lower part is close to the combdrive anchor 90. Such switch design will achieve the higher contact force when the switch connection 85 is turning into the on position shown in FIG. 12, and also the higher mechanical restoring force of hinge structure 98 when the switch connection 85 is turning into the off position shown in FIG. 11. When the combdrive actuator 94 is actuated, the switch connection 85 is moving with the supporting beam 96 of movable combdrive fingers and moving towards to the contact points 81 and 82 till switch connection 85 is physically contacting the switch contact points 81 and 82, and when the combdrive actuator 94 is further actuated, and the switch connection 85 will be sliding into the gap 83 between the contacts 81 and 82, and achieve intimate contact with the switch contacts 81 and 82. At this time, the switch contact 81 and switch contact 82 is electrically connected via the electrically conductive switch connection 85. When there is no electrical voltage applied to the combdrive actuator 94, the mechanical restoring forces from the combdrive actuator hinge 98 will force the switch connection 85 away from switch contacts 81 and 82. At this moment, the switch contact 81 is electrically isolated from the switch contact 82.

Figure 12:
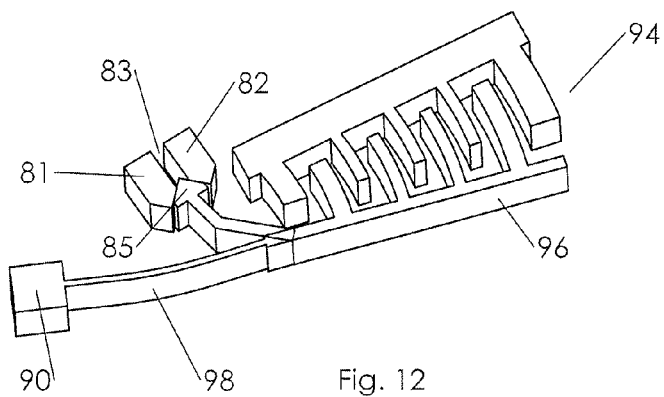
FIG. 12 is a perspective view of MEMS RF ohmic contact switch.

The contact surface shape of the switch contact points 81 and 82, as well as switch connection 85 could be different shapes besides the simple flat surface shown in FIGS. 10, 11 and 12, for example, circular, arc or other special designed curve shapes. These shapes of the contact surface should provide good mechanical and electrical connection between switch connection 85 and contact point 81, and between switch connection 85 and contact point 82. The materials of the switch contact point 81 and 82, as well as switch connection 85 could be metal and metal alloy, silicon coated with metal film or alloy film, polysilicon coated with metal film or alloy film etc.

While FIGS. 11 and 12 show a normally "off" switch, it may also be designed as a normally "on" switch, where contact points 81 and 82 are on the opposite side of supporting beam 96, and the comb drive pulls switch connection 85 away from contact points 81 and 82. In addition, while two contact points are shown, there may also be only one contact point, such that the contact between connection 85 and the one contact point completes a circuit through anchor 90 and resilient beam 98.

Figure 13:
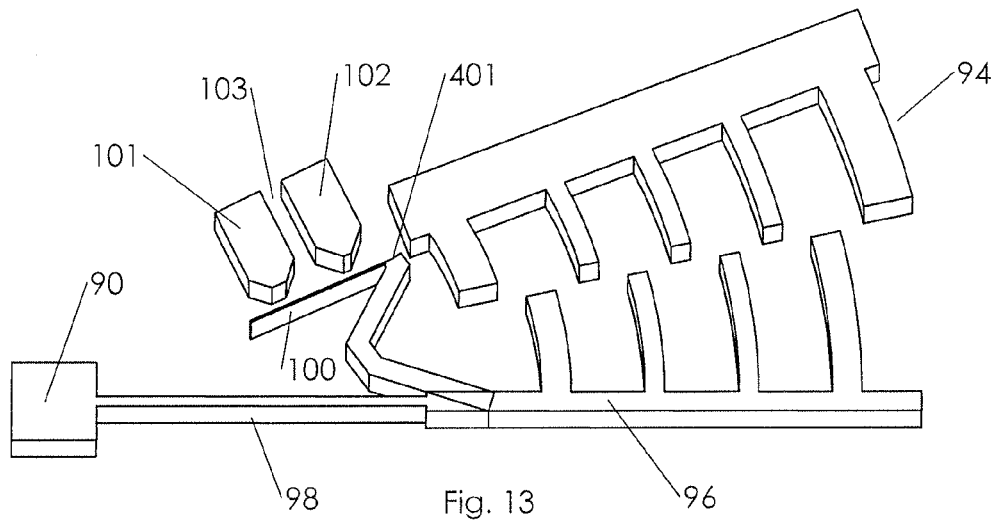
FIG. 13 is a perspective view of MEMS RF ohmic contact switch.

FIG. 13 shows another embodiment of the MEMS RF ohmic contact switch, the switch connection beam 100 is either formed by thick metal or metal alloy film, or silicon/polysilicon structure coated with thick metal film such as metal gold, other metal film or metal alloy film. The beam 100 is flexible as a cantilever structure with a virtual anchor at location of 401.

Figure 14:
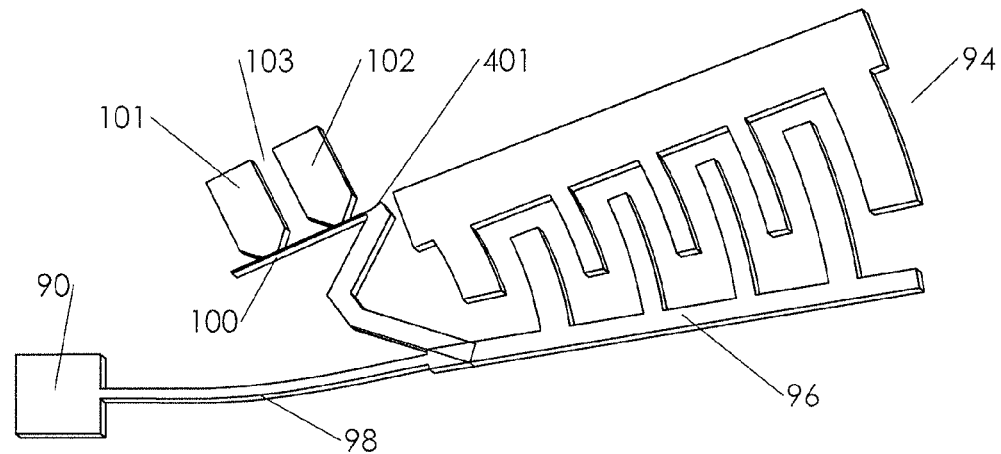
FIG. 14 is a perspective view of MEMS RF ohmic contact switch.

The switch connection beam 100 is mechanically connected to the lower part of the supporting beam 96 of the moveable combdrive actuator. The lower part is close to the combdrive actuator anchor 90. Such switch design will achieve the higher contact force when the switch connection beam 100 is in the on position shown in FIG. 14, and also higher mechanical restoring force when the switch connection 100 is turning into the off the position shown in FIG. 13.

When the combdrive actuator 94 is actuated, the switch connection beam 100 first contacts the switch contact point 101, and when the combdrive actuator 94 is further actuated, the connection beam will be deformed and then contact the switch contact 102. At this time, the switch contact 101 and the contact 102 is electrically connected through the electrical conductive switch connection beam 100 which contacts both switch contacts 101 and 102 cross the gap 103. When there is no electrical voltage applied to the combdrive actuator 94, the mechanical restoring forces from the combdrive actuator hinge 98 and the switch connection beam 100 will force the connection beam 100 away from switch contact 102 first, and then switch contact 101. At this moment, the switch contact 101 is electrically isolated from the switch contact 102.

The contact surface shape of the switch contact point 101 and 102, as well as switch connection 100 could be different shapes, for example, circular, arc or other special design curve shapes. The materials of the switch contact point 101 and 102, as well as switch connection 100 could be metal, metal alloy, silicon coated with metal film or alloy film, polysilicon coated with metal film or alloy film etc.

Figure 15:
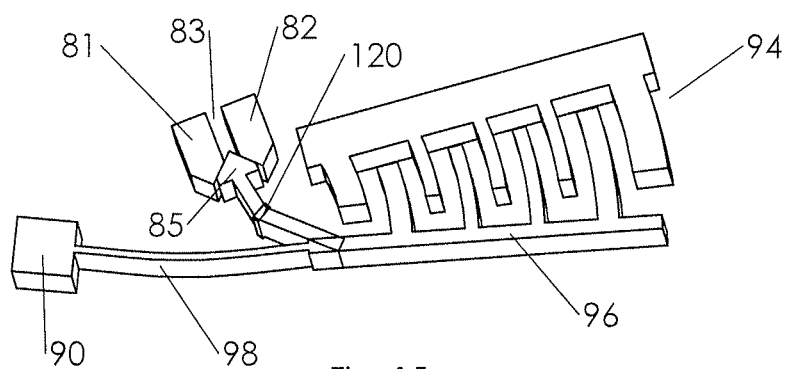
FIG. 15 is a perspective view of MEMS RF ohmic contact switch with electrical isolation structure.
Figure 16:
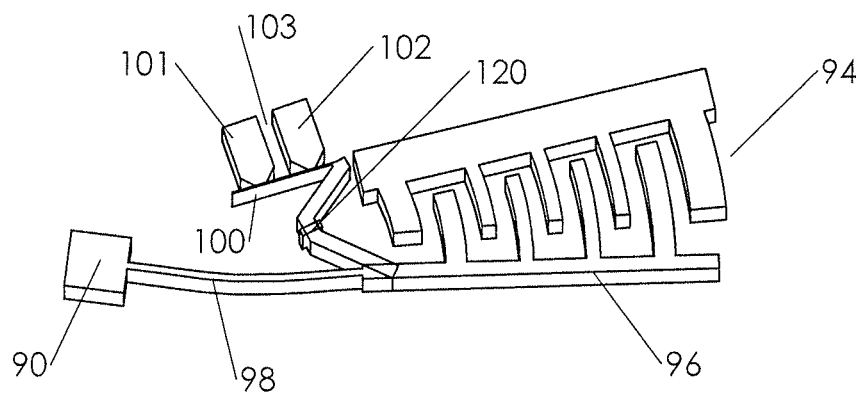
FIG. 16 is a perspective view of MEMS RF ohmic contact switch with electrical isolation structure.
Figure 17:
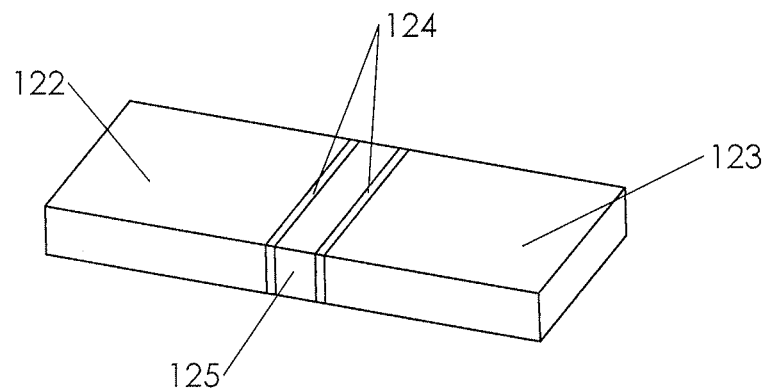
FIG. 17 is a perspective view of trenching and refilling structure

In order to avoid the electrical interference between the RF signal circuit and combdrive actuation circuit, and switch connection 85 and switch connection beam 100 will be mechanically connected with, but electrically isolated with the support beam 96 of the moveable combdrive fingers using electrical isolation structure 120 (shown in FIGS. 15 and 16). The electrical isolation structure 120 could be any format of electrical isolation structure, for example, silicon oxide structure; silicon nitride structure and trenching and dielectrical material refilling structure etc. FIG. 17 shows the cross section of a typical trenching and dielectrical material refilling structure. The layer of the silicon is etched into silicon part A 122 and silicon part B 123 with a etched trench, the silicon oxide liners 124 are created on the sidewalls of the trench gap, depending on the trench size, the trench gap could be totally refilled with dielectrical materials such as silicon oxide and/or silicon nitride, or filled with dielectrical materials (such as silicon oxide and/or silicon nitride) and polysilicon 125. The silicon part A 122 and silicon part B 123 are mechanically connected with, but electrically isolated by trenching and refilling dielectrical materials 124 and polysilicon 125.

FIGS. 15 and 16 show two MEMS RF ohmic contact switches with trenching and dielectrical materials refilling structure 120. The switch connection 85 and switch connection beam 100 are mechanically connected with, but electrically isolated from the combdrive actuator 94 using the trench and dielectrical materials refilling structure 120.

The trench and dielectrical materials refilling structure 120 could be dove tail shaped, arc shaped, triangle shaped, etc. mechanical interlocking structures to increase the mechanical connection strength between two connected parts, for example, part A 122 and part B 123 in FIG. 17.

Figure 18:
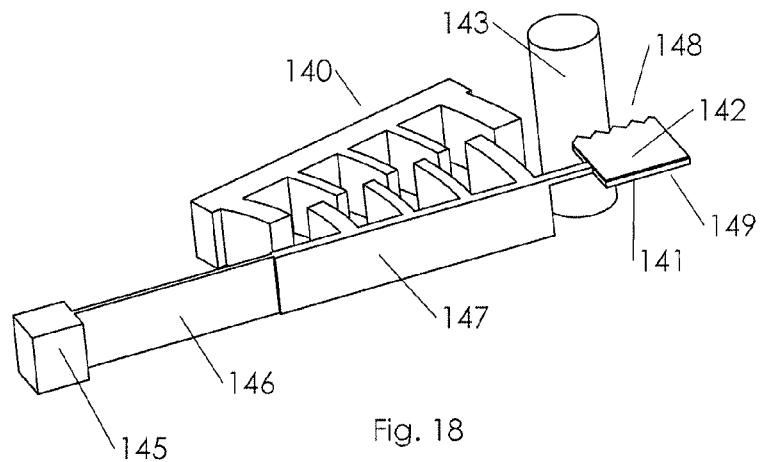
FIG. 18 is a perspective view of MEMS optical shutter/chopper.
Figure 19:
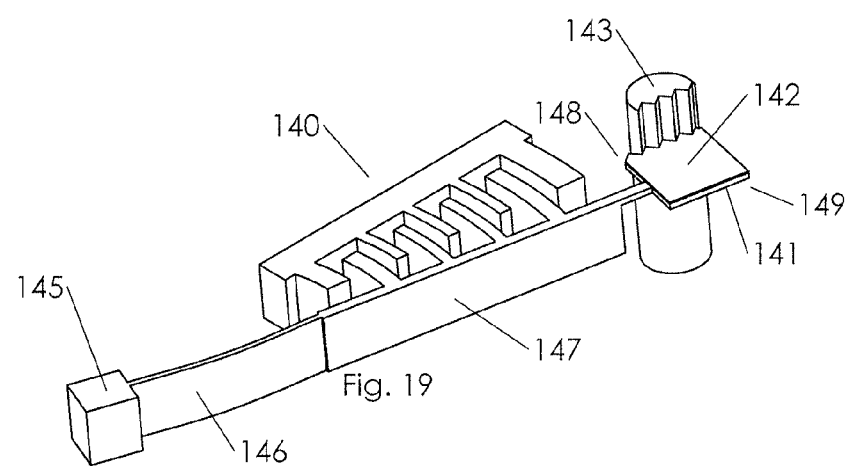
FIG. 19 is a perspective view of MEMS optical shutter/chopper.

When a thin shutter/plate 149 is placed on the tip of the support beam 147 of the combdrive actuator 140 (FIG. 18), the shutter/plate will move with the carrier body such as the supporting beam 147 of the moveable combdrive fingers to change its position, it can move into the positions which will interact with the full light beam 143 or with partial light beam 143 in order to achieve the light beam modulation such as filtering, blocking and attenuation (shown in FIG. 19). The shutter 141 is preferably a thin layer of metal, dielectrical material film, etc. It could be also a layer of silicon or polysilicon etc. coated with optical film 142 such as a transmissive film which let certain light wavelengths pass or a reflective film which will block certain light wavelengths, for example, a thin layer metal film such as Al or gold film or other optical film materials coated on the surface of shutter 141.

In the combdrive structures, electrostatic actuators and their arrangement shown in FIGS. 1 and 10, if a thin layer of plate/shutter is placed on the tips 410 of the supporting structures of moveable fingers, then a thin plate/shutter or the thin plates/shutters will move with the moveable comb fingers under the actuation.

Figure 20:
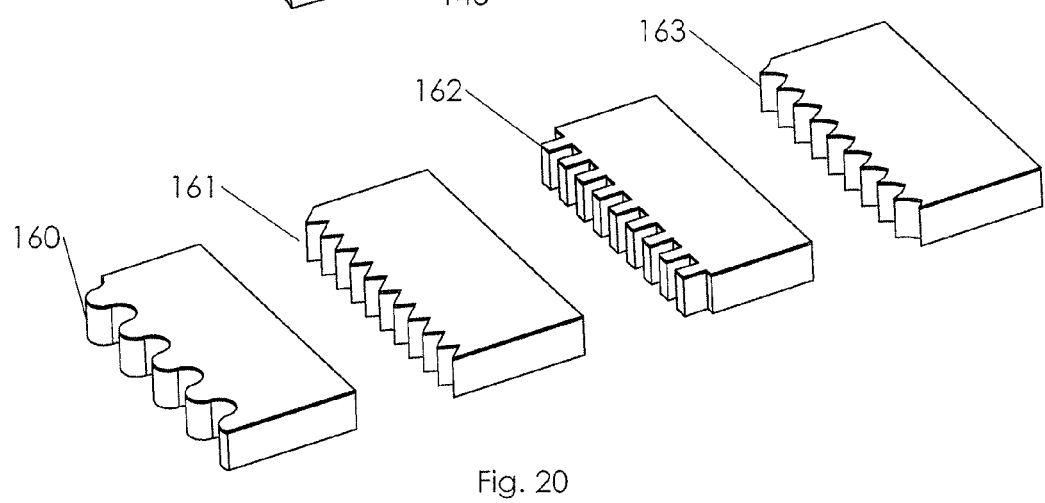
FIG. 20 is a perspective view of the edge profiles of shutter/chopper.

When the shutter interacts with the partial light beam 143, the shutter edge 148 interacting with the light beam 143 preferably has some special designed edge profiles such as the 90 deg. teeth profile in order to improve the optical performances such as reducing the PDL (Polarization Dependant Loss), The shutter edge could be straight edge such as edge or other edge profiles shown in FIG. 20 or any other specially design profiles. Edge 161 is circular shape, edge 161 is triangle shape, edge 162 is the square shape and edge 163 is arc shape.

Figure 21:
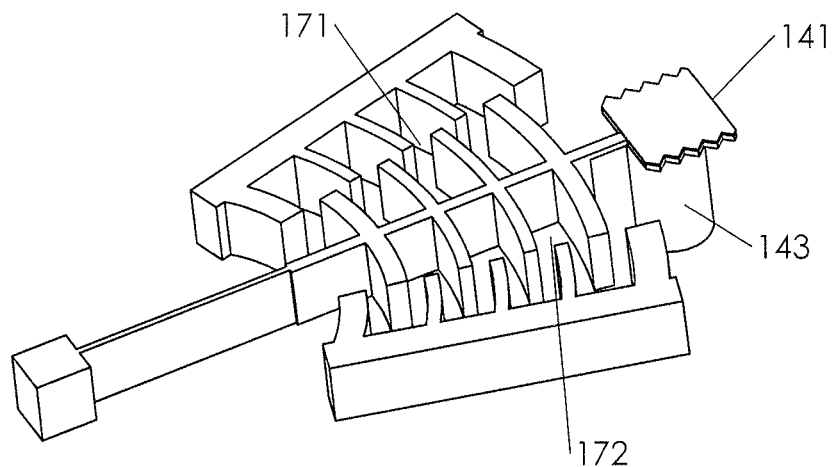
FIG. 21 is a perspective view of MEMS optical shutter/chopper.
Figure 22:
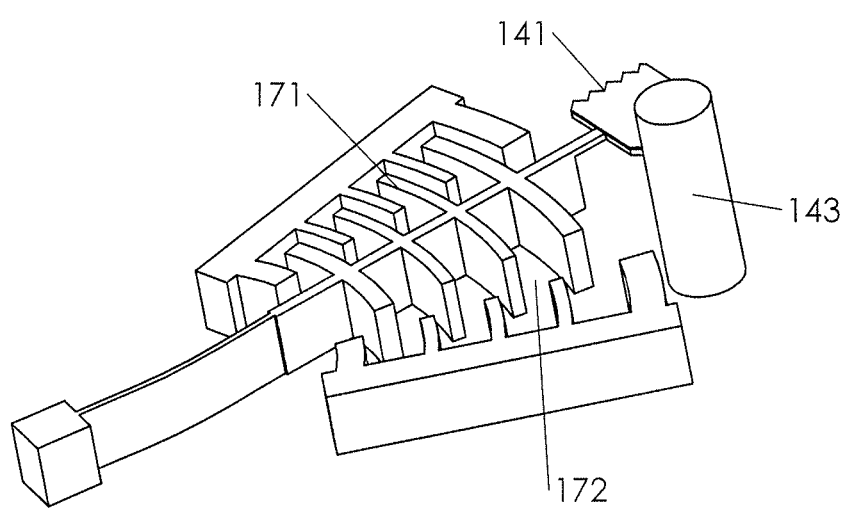
FIG. 22 is a perspective view of MEMS optical shutter/chopper.

In order to increase the displacement of the shutter 141, two combdrive actuators 171 and 172 may be used to drive the shutter, as shown in FIG. 21 and FIG. 22. FIG. 22 shows the shutter 141 actuated by actuator 171 to allow light beam 143 to pass through without any interaction. FIG. 21 shows the shutter 141 interacting with or fully blocking the full light beam 143.

Figure 23:
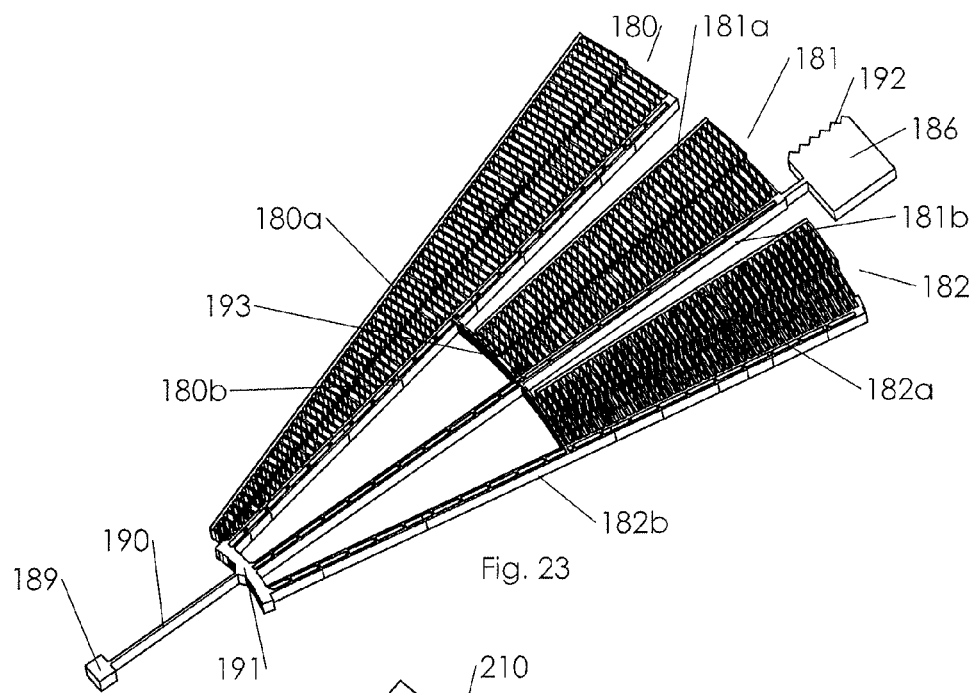
FIG. 23 is a perspective view of multiple combdrive actuators for MEMS optical shutter/chopper.

For the applications mentioned herein such as MEMS shutter/chopper and MEMS RF ohmic contact switch etc., single combdrive actuators may not be able to supply sufficient shutter/chopper displacement, driving force and contact force. To address this, multiple combdrive actuators may be used. FIG. 23 shows a multiple combdrive actuators used for the MEMS optical shutter/chopper or optical variable attenuator. Combdrive actuators 180, 181 and 182 with fixed comb fingers 180a, 181a and 182a, movable comb fingers 180b, 181b and 182b are working together to actuate the shutter 186. The supporting beams of movable comb fingers are connected by the structures 191 and 193. The shutter 186 is connected to the supporting beam of movable comb fingers 181b. The three combdrive actuators 180, 181 and 182 share the same hinge 190 and anchor 189. The same multiple actuators arrangement could be also used for RF Ohmic contact switch or for RF variable capacitor device.

Figure 24:
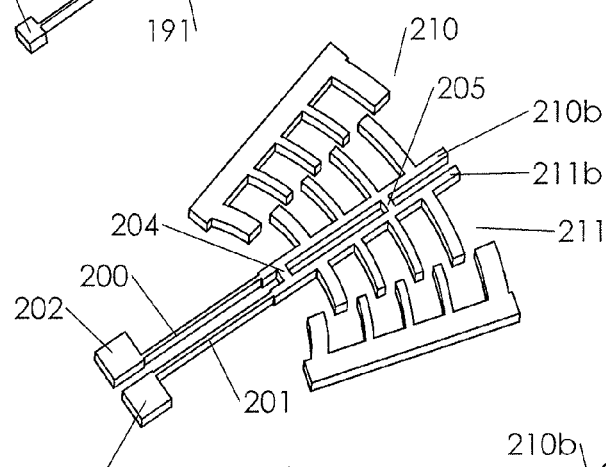
FIG. 24 is a perspective view of combdrive actuators with double straight beam hinges.

The hinge of the combdrive actuators could be many different shapes, such as straight beam shape, serpentine shape etc. For example, a double straight beam hinge shown in FIG. 24 may be used to increase the robustness of the combdrive actuator. The supporting beams 210b and 211b of the combdrive actuator 210 and 211 are connected by connection structures 204 and 205, and connected to the anchors 202 and 203 by hinge 200 and 201 respectively.

Figure 25:
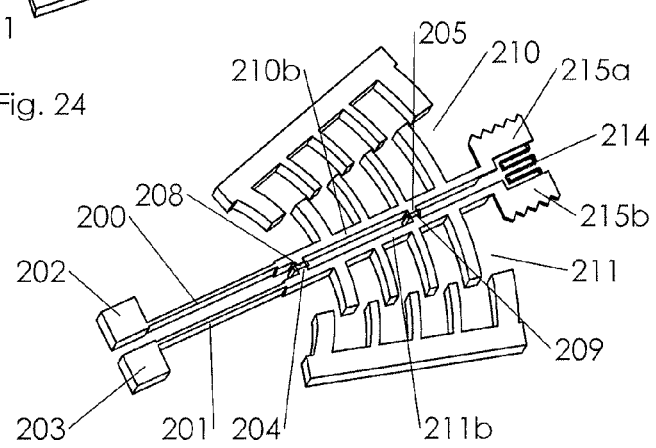
FIG. 25 is a perspective view of combdrive actuators with double straight beam hinges with electrical isolation structure for MEMS optical IR source, shutter/chopper.

Besides providing the structure robustness, the double hinge 200 and 201 may also provide an electrical path to power the electrical components on the moveable structure of the actuators. For example, FIG. 25 shows shutters 215a and 215b, and a thermal filament 214 actuated by the combdrive actuator 210 and 211. The thermal filament 214 could be used as an IR light source. The carrier bodies such as the supporting beams 210b and 211b are mechanically connected by the connection structures 204 and 205, but they are electrically isolated by the trenching and dielectrical material refilling structure 208 and 209 on the connection structures 204 and 205. If an electrical potential is applied between anchor 202 and 203, then the filament 214 will be turned on through the electrical path from anchor 202, hinge 200, supporting beam 210b, shutter 215a, filament 214, shutter 215b, supporting beam 211b and hinge 201 to the anchor 203.

Figure 26A:
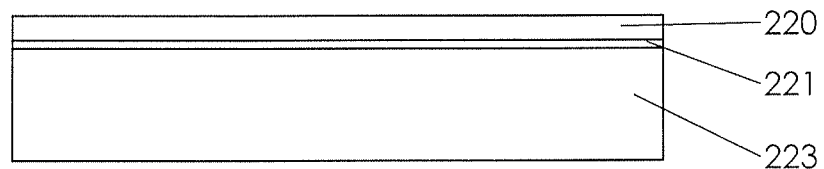
FIG. 26a-26e is process flow to make a MEMS electrostatic rotational actuator.

There are many methods to fabricate the structures described herein. A typical microfabrication method for structures mentioned above is described below. Other fabrication techniques may be employed as will be understood by those skilled in the art, but will not be detailed herein. This process starts with a SOI (Silicon On Insulator) wafer (shown in FIG. 26a). The device layer silicon 220 is thinner than the handle wafer 223. The buried silicon oxide layer 221 is sandwiched between device layer 220 and handle wafer 223.

Figure 26B:
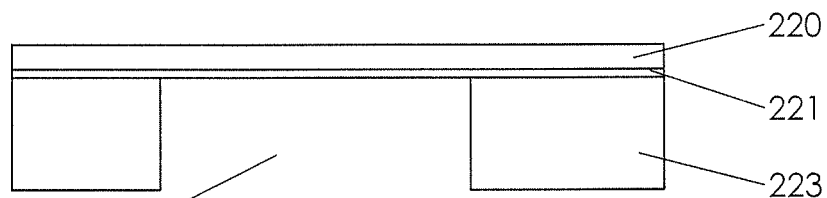
Figure 26C:
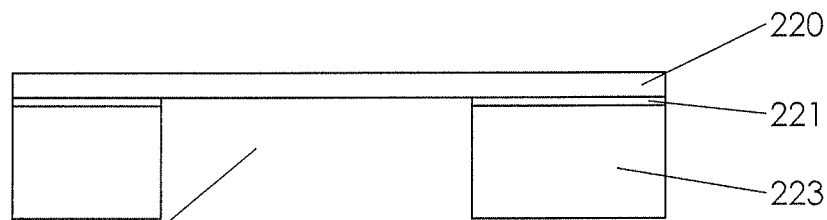
Figure 26D:
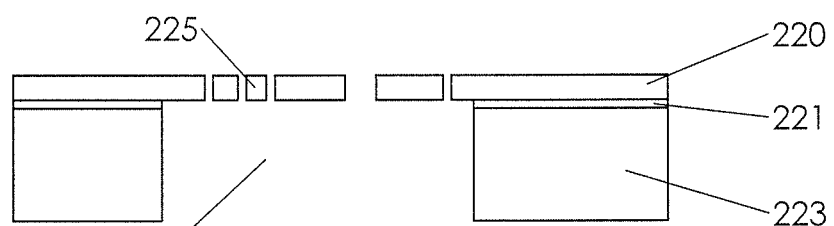
Figure 26E:
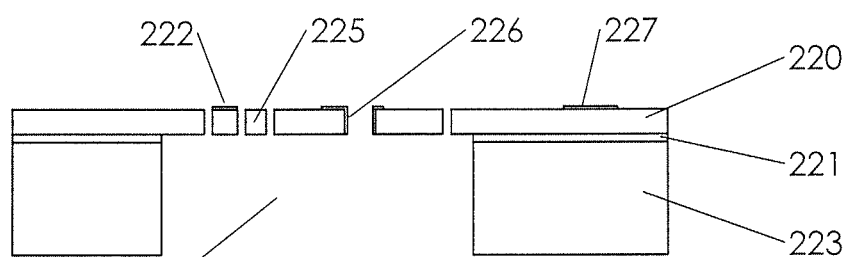

A lithography and DRIE (Deep Reactive Ion Etching) are used to etch the handle silicon 223 to the oxide layer 221 from backside of the wafer create a cavity 224 (FIG. 26b). A subsequent oxide etching is used to remove the oxide at bottom of the cavity 224 (FIG. 26c). A lithography and DRIE (Deep Reactive Ion Etching) are used to etch the device silicon layer 220 to the oxide layer 221 from front side of the wafer to create the combdrive actuator and other components 225 such as shutter, switch contacts etc. (FIG. 26d). A shadow metal process is used to make the shutter metal 222, wire bonding pads 227 as well as the contact metal or metal alloy 226 on the side wall of electrical contact structures (FIG. 26e). If the special optical film is required on the shutter/plate, these special optical film coatings can be done before the wafer process to make shutter/plate, and the actuator structures etc. The electrical contact metal or metal alloy can be made by electroplating before the wafer process to make shutter/plate, and the actuator structures etc.

Figure 27A:
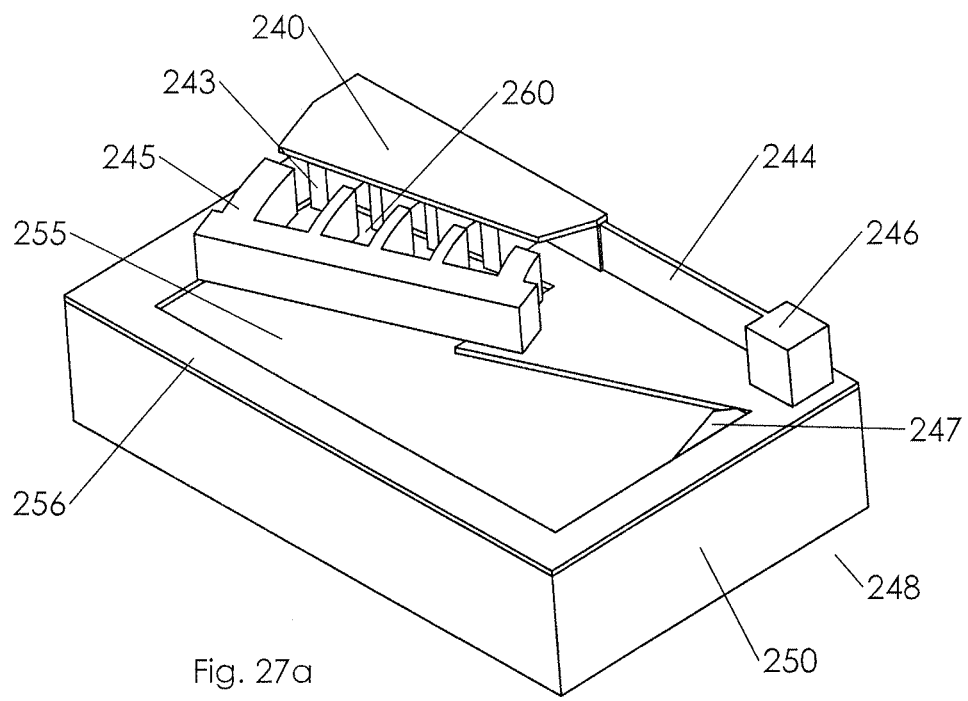
FIG. 27a-27b is a perspective view of MEMS display element.

FIG. 27a shows a display element using a cantilever type of MEMS electrostatic rotational actuator. The optical blocking structure or film 240 is on the top surface of the combdrive movable fingers 243. As shown, the top surface of the combdrive fixed fingers 245 is lower than the top surface of the combdrive movable fingers 243 so that no mechanical interference between the fixed combdrive fingers 245 and the optical blocking structure or film 240. The anchor 246 and fixed combdrive fingers 245 are attached to the waveguide plate 248. The light is injected inside the waveguide plate from the one of its sidewall surface 250, the light is traveling within the waveguide plate, will be reflected on the top and bottom surface of the waveguide plate. The waveguide is such designed (such as the waveguide thickness, and optical reflector attached to its bottom surface etc.) so that the light will be reflected or only seen from its top surface 255. Or the light is injected inside the waveguide plate from the its bottom surface so the light will travel from the back surface of the transparent waveguide plate through the display element shown in FIG. 27a.

The part of the top surface 255 of the waveguide plate is covered with optical blocking film 256 and electrical driving circuits 247 such as TFT (Thin Film Transistor) circuit which is typically used for the LCD (Liquid Crystal Display). In other words, the waveguide plate could take advantages of the design and manufacturing technology of LCD display.

The bottom surface of the fixed combdrive fingers is contacted to the top surface of 255 the waveguide plate, while the bottom surfaces of the hinge 244 and movable combdrive fingers 243 are higher than the top surface 255 of the waveguide plate. A gap clearance is required to allow the free movement of the hinge 244 and moveable fingers 243.

Figure 27B:
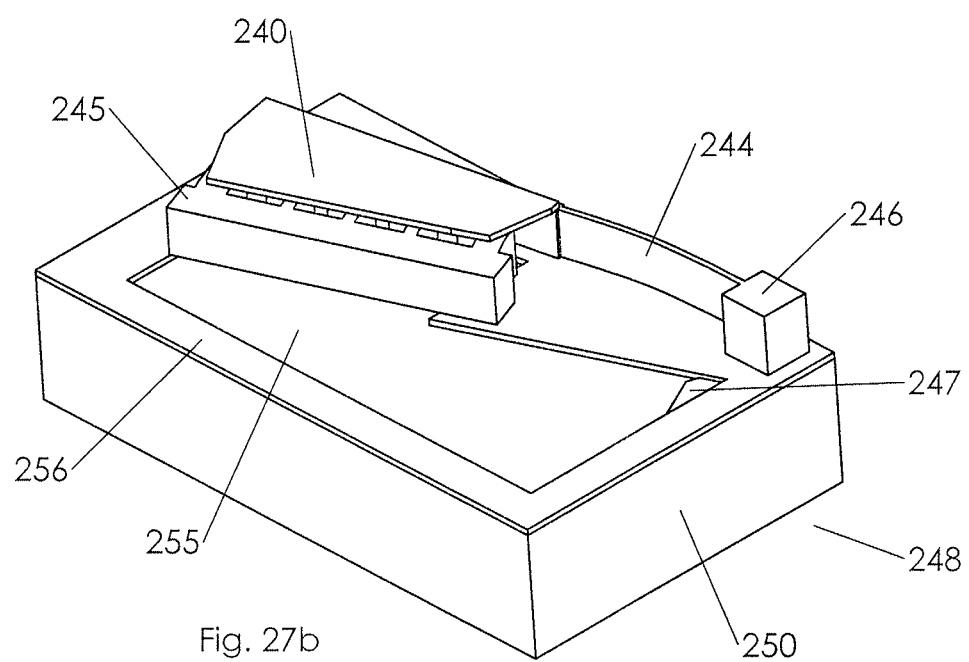

When there is no actuation voltage between the fixed and movable comb fingers 245 and 243, the gap 260 between the fixed and movable comb fingers will allow the pass through of light from the waveguide plate (FIG. 27a). When an actuation voltage is applied between the fixed and movable fingers 245 and 243, the moveable fingers 243 will move close to the fixed fingers 245, the gap 260 will be smaller; therefore, less light will pass through from the gap 260. The higher the applied voltage, the less the light will pass through. When the voltage is higher enough, the gap 260 will disappear, and no light from the waveguide plate will be totally blocked (FIG. 27b). The gap 260 can be actuated in the state of on-off at different high frequency to show the different light grey scale. The light grey scale can also be achieved by size of gap 260 under different actuation voltage.

The applied voltage could be DC, AC or DC plus AC. In the case of AC voltage, the frequency of the AC voltage will be close to the nature frequency of the moveable combdrive structure so that the moveable combdrive structure is working in the resonant mode. In the resonant working mode, much less electrical power consumption will be expected.

Figure 28A:
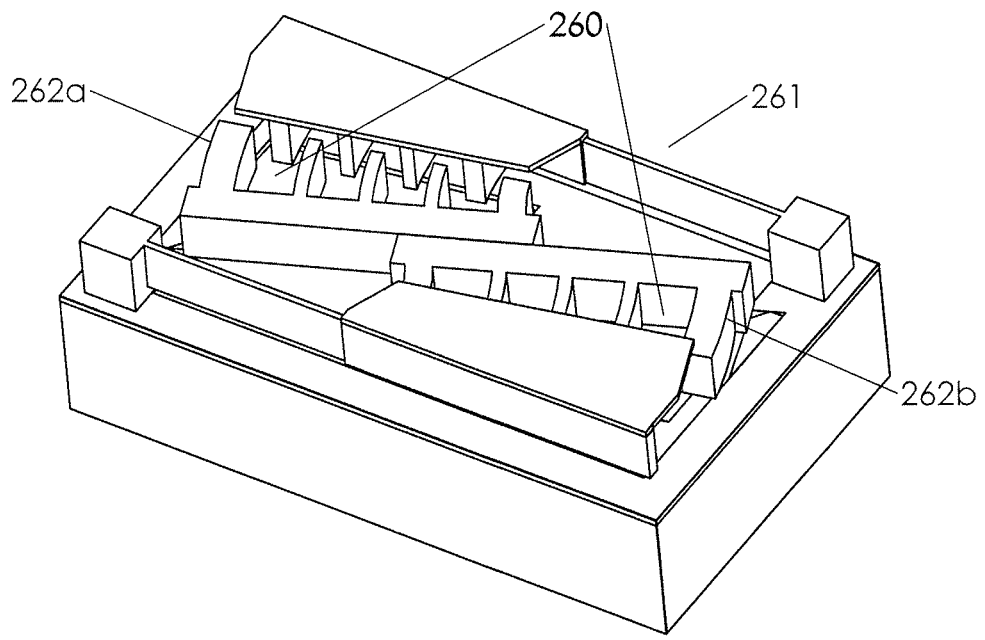
FIG. 28a-28b is a perspective view of MEMS display pixel.
Figure 28B:
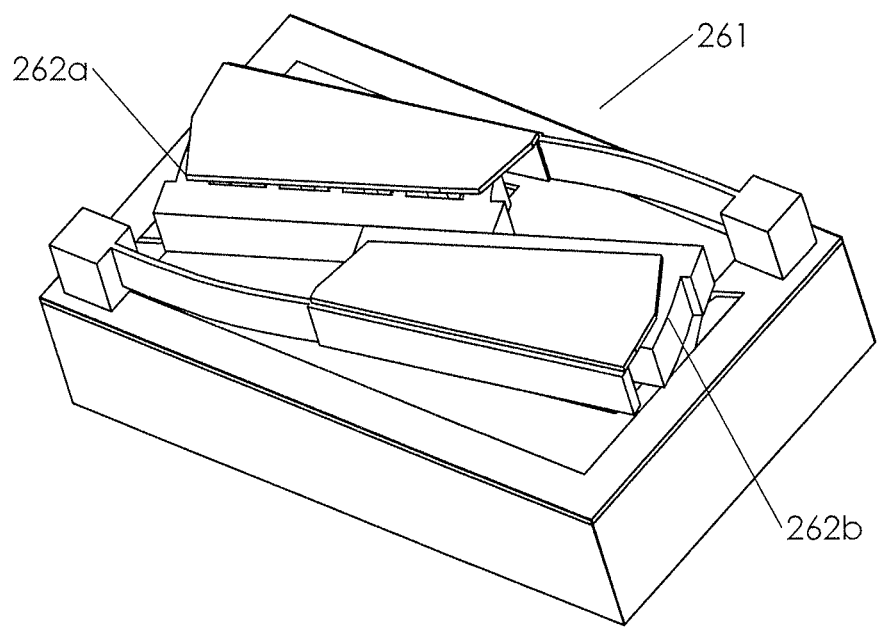

One or more than one display element could be used to form the display pixel 261 of larger display panel. FIG. 28a shows the two display elements to form a display pixel 261. The maximum light passes through the finger gaps 260 when no actuation voltages are applied to the two actuators 262a and 262b, while the light path is fully closed when the two combdrive actuators 262a and 262b are fully actuated (FIG. 28b).

Figure 29A:
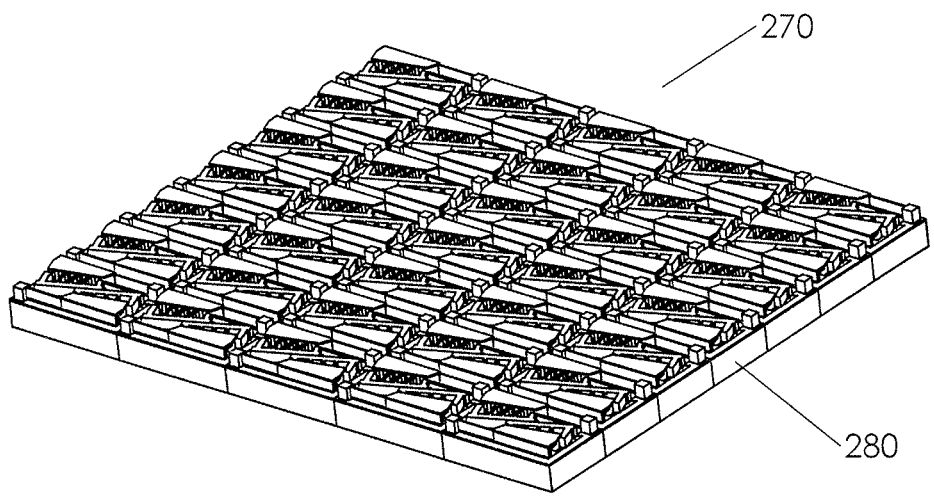
FIG. 29a-29b is a perspective view of MEMS display panel.
Figure 29B:
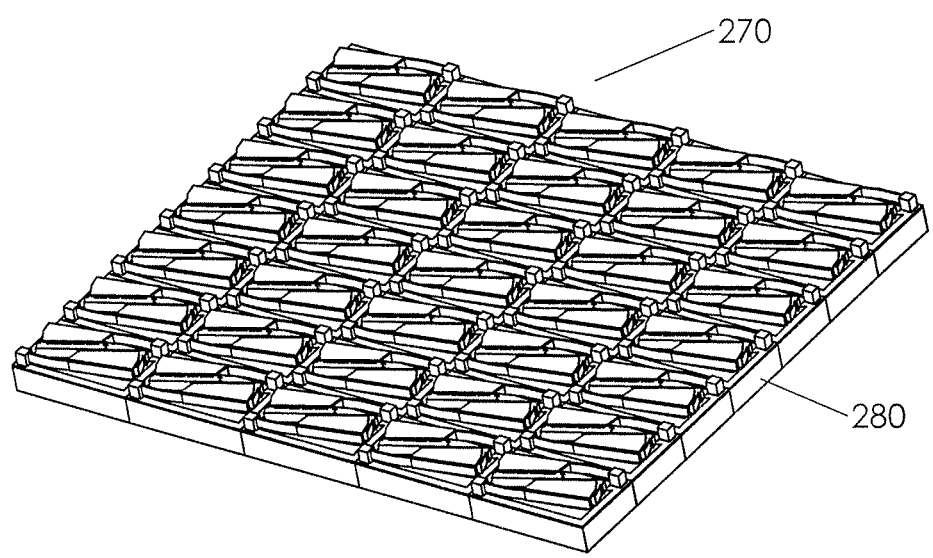

The array of such display pixel 261 shown in FIG. 29a will form a high power efficiency display panel 270. The RGB LED die array could be attached to one side wall 280 or more than one side walls of waveguide plate to inject the modulated RGB light into the waveguide plate. The right control coordination between the combdrive actuator control circuits such as TFT driving circuit and the RGB LED diode array will achieve colorful, dynamic, more power efficient color display panel. The display panel could be used for portable electronics, Smart phones and TV etc. FIG. 29a shows the open states of all the combdrive actuators on the display panel 270, in which the light from waveguide plate passes through the gap between the fixed and moveable comb fingers. FIG. 29b shows the closed states of all the combdrive actuators on the display panel 270, in which the light from waveguide plate is fully blocked from closed gap between the fixed and moveable comb fingers. The modulated RGB light can also be injected into the waveguide plate from its back surface, so the light will travel through the transparent waveguide plate, and then through the display element.

There are other implementations of display panel using cantilever type of MEMS electrostatic rotational actuator. The open and close of the light path in each display element is achieved by the shutter plate shown in FIGS. 18, 19, 21, 22 and 23. The light blocking film is covered on the top surface of the waveguide plate except for the area of the light path window. The actuated combdrive will move the shutter in or out the position right above the light path window to close and open the light beam.

The open and close of the light path using MEMS shutter actuated by electrostatic rotational actuators could be used for the high sensitive photo diode detection array. If the array of the electrostatic combdrive actuated shutter/chopper structures array is placed in the focal plane of, or right in front of the photo detection diode array such as IR detector array plate, then the array of the open and closed electrostatic combdrive actuated shutter/chopper structures shown in FIGS. 18, 19, 21, 22, 23, 24, 27a, 27b, 28a, 28b, 29a and 29b will provide the function of light chopping and light modulation to each individual photo diode/pixel, which will increase the reliability and sensitive of the detection diode array.

Figure 30A:
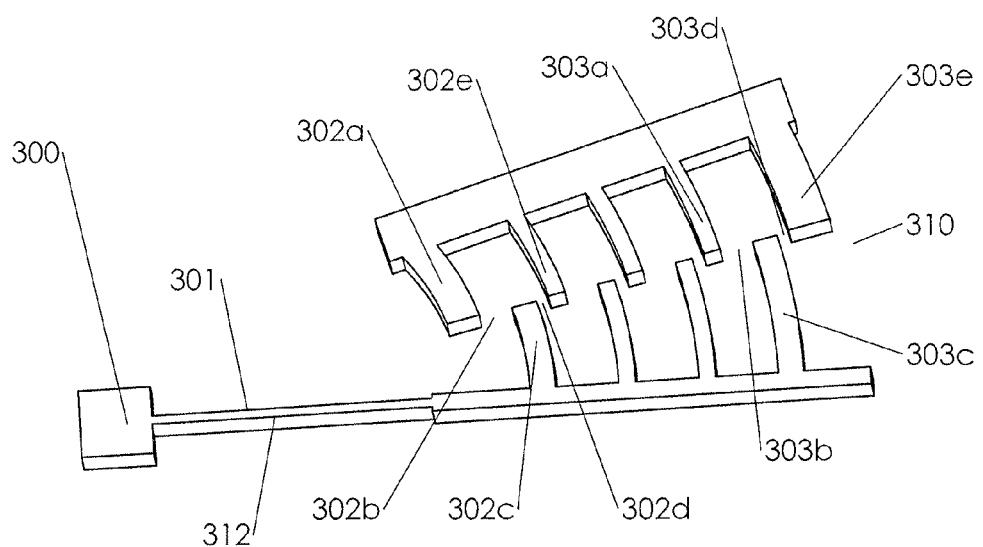
FIG. 30a is a perspective view of comb finger gap offset.

For the MEMS electrostatic rotational actuator, since the movements of the moveable fingers are moving with the bending of the hinge 312 (see FIG. 30a), the rotational center is not the anchor 300, but a virtual point 301 on the hinge 312. For this reason, the moveable and fixed fingers shapes, and finger gaps have to be designed to make sure each movable finger has balance electrostatic forces from two adjacent fixed fingers during whole actuation phase or whole travel of the moving fingers in order to have the best actuation abilities. For example, the initial finger gap 302d between fingers 302e and 302c is smaller than the initial finger gap 302b between fingers 302a and 302c, and the initial finger gap 303d between fingers 303e and 303c is smaller than the initial finger gap 303b between fingers 303a and 303c.

Figure 30B:
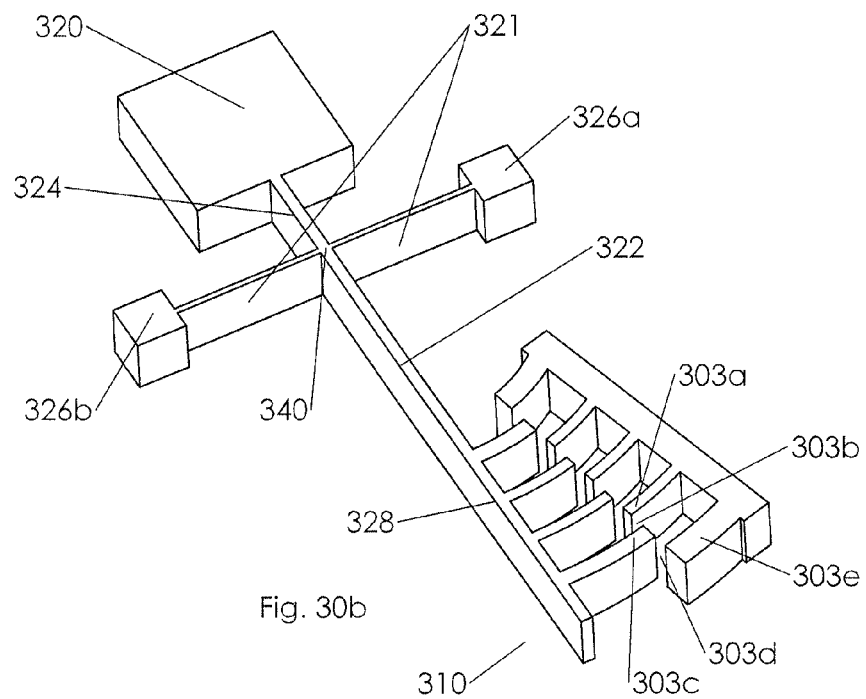
FIG. 30b is a perspective view of hinge design and balance weight design a MEMS electrostatic rotational actuator.

If the more pure rotational movement of the carrier body such as the supporting beam 328 and movable fingers of combdrive actuator 310 are required, then thin hinge 321 should be used to connect the two anchors 326a and 326b. The thicker and much stiff connection beam 322 connects to the center of hinge 321 and supporting beam 328, while the thicker and much stiff connection beam 324 connects to the center of hinge 321 and weight balance 320 of the supporting beam 328 and movable comb fingers (FIG. 30b). The finger gap 303d between fingers 303e and 303c is about same as the finger gap 303b between fingers 303a and 303c (FIG. 30b). The hinge center 340 is the virtual center of the rotational movement of supporting beam 328 and movable comb fingers. The supporting beam 328 could have more moving fingers and corresponding fixed comb fingers to form the similar structure shown in FIGS. 21 and 22.

Figure 30C:
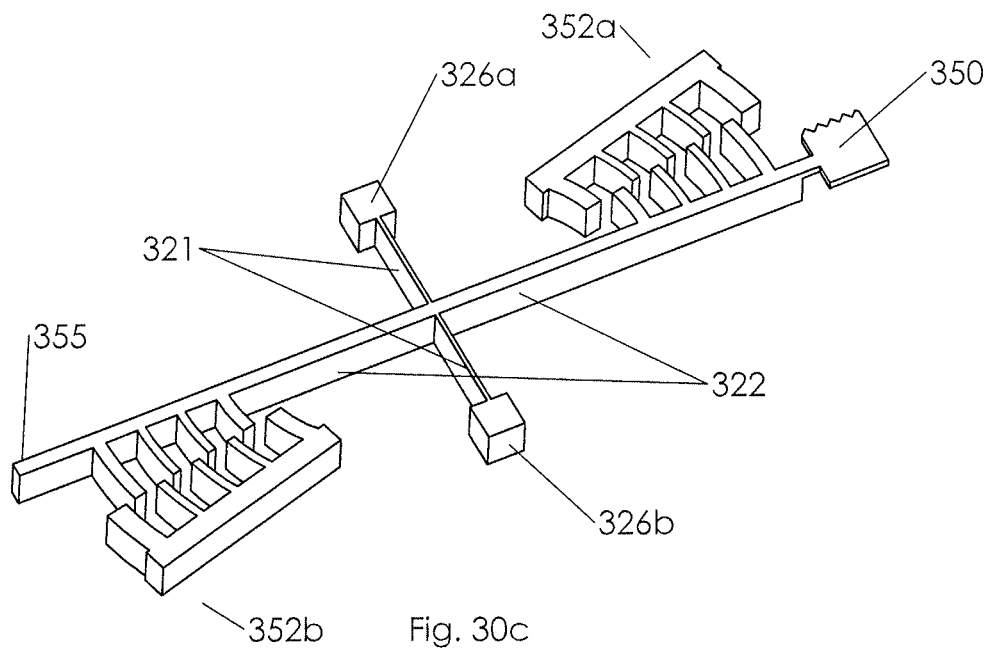
FIG. 30c is a perspective view of shutter, hinge design and balance combdrive actuators of MEMS electrostatic rotational actuator.

In FIG. 30c, the balanced weight 320 could be replaced by an electrostatic actuator. As shown, the two actuators 253a and 352b work together to increase the actuation force, and displacement of shutter/chopper 350. The thin plate of shutter and chopper could be also placed at the location of 355.

Figure 30D:
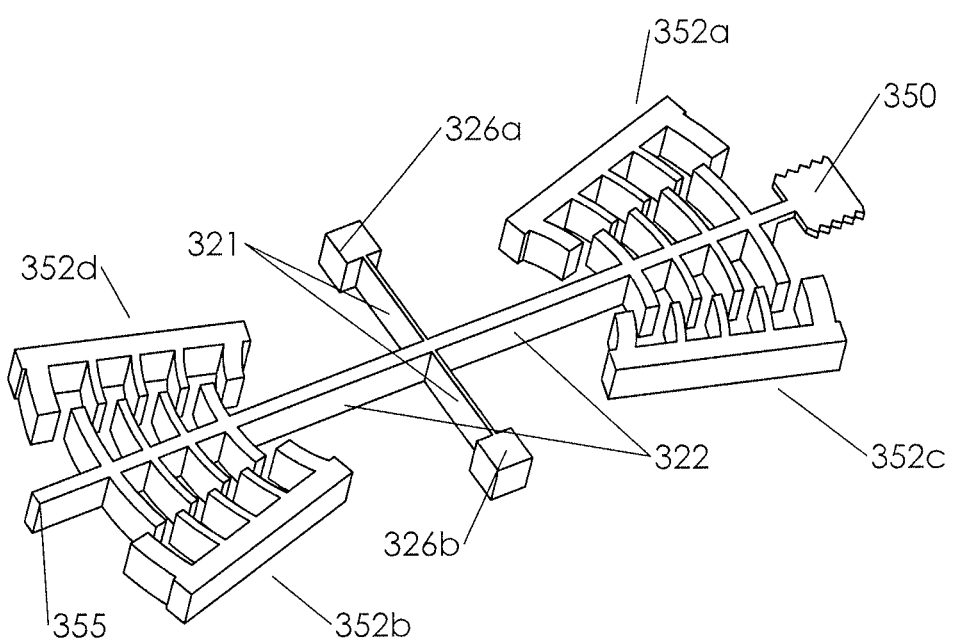
FIG. 30d is a perspective view of shutter, hinge design and balance combdrive actuators of MEMS electrostatic rotational actuator.

In FIG. 30d, more actuators may be added, where the actuators 352a, 352b, 352c and 352d are working together to establish the balanced structure and at the same time, more actuation force and larger travel displacement of shutter/chopper 350. The thin plate of shutter and chopper could be also placed at the location of 355 as long as the balanced structure is established.

Figure 30E:
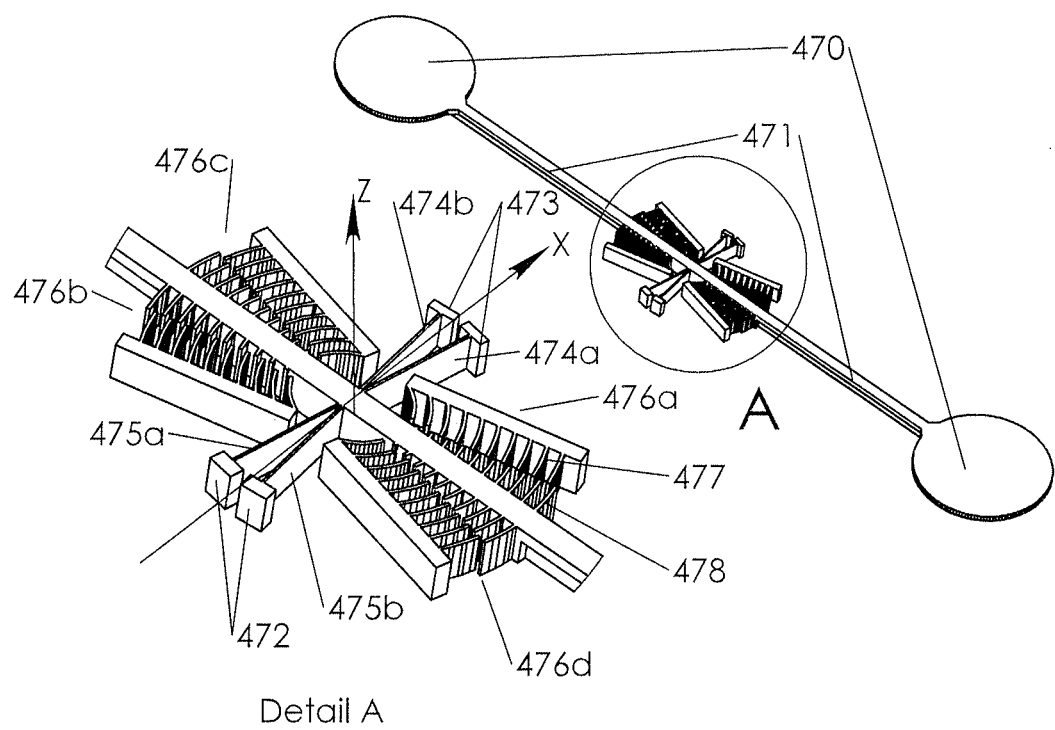
FIG. 30e is a perspective view of shutter, hinge design and balance combdrive actuators of MEMS electrostatic rotational actuator.

In FIG. 30e, the balanced structure could be replaced by shutters/choppers 470 and electrostatic actuators 476a, 476b, 476c and 476d. As depicted, the two actuators 476a and 476b work together to increase the actuation force and to rotate the shutters/choppers anticlockwise around axis Z, while the two actuators 476c and 476d work together to rotate the shutters/choppers clockwise around axis Z. One of the shutter/chopper 470 could be replaced by a balanced weight.

In the depicted embodiment, the thicker and stiffer connection beams 471 connect the shutters/choppers 470 and thin and flexible hinges 474a, 474b, 475a and 475b, which are anchored at anchors 472 and 473. Hinge 474a and 474b are arranged at an angle starting from the point where hinges 474a and 474b meet the stiff connection beams 471, the same arrangement also apply to the hinges 475a and 475b. Such angled hinge arrangement is to prevent the shutters/choppers from out of plane rotation around axis X.

For electrostatic combdrive actuator, the finger gaps are designed to make sure each movable finger has balance electrostatic forces from two adjacent fixed fingers during whole actuation phase or whole travel of the moving fingers in order to have the best actuation abilities. Again the fixed comb fingers 477 and movable comb fingers 478 of actuators 476a, 476b, 476c and 476d are designed with curves and profiles so that there is smooth interaction during the full range of actuation and no interferences such as a pull-in effect, etc. While the fingers may have a consistent radius of curvature, this may not always be the case. For example, as the resilient beam bends, the virtual rotational center may shift, such that the curvature of the finger will also be different along the length of the fingers. In one example, the design of the fingers may be approximated by modeling the trajectory of the fixed portion of the comb under a mechanical load that approximates the electrostatic force that will be applied, and then designing the curvature of the fingers to follow this trajectory.

Figure 31:
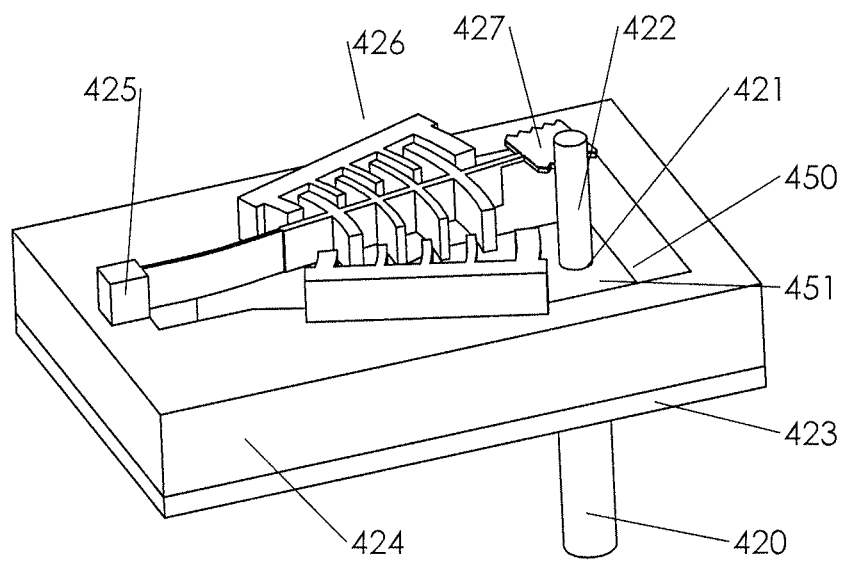
FIG. 31 is a perspective view of a MEMS electrostatic rotational actuator with a pinhole structure.

FIG. 31 shows a thin shutter/chopper plate actuated by cantilever type of MEMS electrostatic rotational actuator with a pinhole structure. The thin shutter/chopper plate actuated by MEMS electrostatic rotational actuator is shown FIGS. 18, 19, 21, 22, 30a, 30b, 30c, 30d and 30e described herein. A thin plate 423 with a pinhole 421 is separated from the shutter/chopper plate 427 by a space plate 424. The pinhole is located right underneath the shutter/chopper plate when it is not actuated. The electrostatic actuator 426 moves the shutter/chopper 427 around its anchor 425. When a light beam 420 passes the pinhole 421 on the plate 423, the light beam 420 will be reshaped into light beam 422. Typically the light beam 421 is narrower than light beam 420. This part of light beam 420 is blocked by the plate 423 when the light beam 420 is passing pinhole 421.

The thin shutter/chopper plate actuated by cantilever type of MEMS electrostatic rotational actuator is shown FIGS. 18, 19, 21, 22, 30*a*, 30*b*, 30*c*, 30*d* and 30*e* described herein could have the same pinhole structure shown in FIG. 31.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples above.

What is claimed is:

1. A MEMS actuator, comprising:
a combdrive carried by a substrate, the combdrive having a fixed comb and a movable comb, each of the fixed comb and the movable comb having comb fingers, the fixed comb being immovably carried by the substrate and the movable comb being carried by a carrier body;
a resilient body comprising a first part attached between a first anchor point on the substrate and a first side of the carrier body and a second part attached between a second anchor point and a second side of the carrier body, the first part extending toward the second anchor point relative to the first anchor point and the second part extends toward the first anchor point relative to the second anchor point such that the carrier body is supported by the resilient body between the first anchor point and the second anchor, each of the first and second parts of the resilient body comprises first and second beams, the first and second beams being separated by a spacing that decreases as the first and second beams extend toward the carrier body from the respective anchor point, each of the first and second parts of the resilient body being attached at a first end and on opposite sides of the movable comb and permitting cantilevered, pivotal movement of the movable comb parallel to a plane defined by the comb fingers of the fixed comb in response to an actuating voltage applied to the combdrive, the comb fingers of the fixed and movable combs being curved in the direction of the movement.

2. The MEMS actuator of claim 1, wherein the fixed comb and the movable comb are electrically isolated.

3. The MEMS actuator of claim 2, wherein the movable comb moves toward the fixed comb in response to the actuating voltage.

4. The MEMS actuator of claim 1, wherein the combdrive comprises a plurality of movable combs and fixed combs.

5. The MEMS actuator of claim 4, comprising movable combs on opposed sides of the carrier body, the opposed movable combs permitting pivotal movement of the resilient body in opposed directions.

6. The MEMS actuator of claim 4, comprising movable combs on the same side of the carrier body.

7. The MEMS actuator of claim 1, further comprising at least one contact point on the substrate and an electrically conductive connector carried by the carrier body, the movement of the movable comb controlling the connection of the at least one contact point and the connector.

8. The MEMS actuator of claim 7, comprising more than one contact point, and the connector acting as a switch between the contact points.

9. The MEMS actuator of claim 7, wherein the connector is mounted toward the resilient body relative to the movable comb.

10. The MEMS actuator of claim 7, wherein the connector is electrically isolated from the movable comb and the resilient body.

11. The MEMS actuator of claim 1, wherein the carrier body carries a shutter, the shutter preventing transmission of some or all wavelengths in a beam of light, the carrier body-controlling the position of the shutter within the beam of light.

12. The MEMS actuator of claim 11, wherein the shutter comprises a profiled edge.

13. The MEMS actuator of claim 11, wherein the shutter is attached at an end of the movable comb.

14. The MEMS actuator of claim 11, wherein the shutter is mounted across at least a portion of the comb fingers of the movable comb.

15. The MEMS actuator of claim 11, wherein the substrate comprises an aperture, the beam of light passing through the aperture.

16. The MEMS actuator of claim 1, wherein each beam is electrically isolated from the other and electrically connected to separate anchor points to form a circuit through the resilient body between the anchor points.

17. The MEMS actuator of claim 16, wherein the circuit is connected to a filament carried by the movable comb.

18. The MEMS actuator of claim 1, further comprising a counterweight carried by the carrier body opposite the movable comb relative to the resilient body.

19. The MEMS actuator of claim 18, wherein the counterweight comprises one or more movable combs.

20. The MEMS actuator of claim 1, wherein the spacing of the comb fingers of the movable comb within the comb fingers of the fixed comb is scaled to balance the applied electrostatic forces as the movable comb moves.

21. The MEMS actuator of claim 1, wherein the curvature of the fingers follows the trajectory of the movable comb when an electrostatic force is applied.

22. A variable capacitor, comprising:
a combdrive carried by a substrate, the combdrive having a first electrode comprising a fixed comb and a second electrode comprising a movable comb, each of the fixed comb and the movable comb having comb fingers, the fixed comb being immovably carried by the substrate and the movable comb being carried by a carrier body;
a resilient body comprising a first part attached between a first anchor point on the substrate and a first side of the carrier body and a second part attached between a second anchor point and a second side of the carrier body, the first part extending toward the second anchor point relative to the first anchor point and the second part extends toward the first anchor point relative to the second anchor point such that the carrier body is supported by the resilient body between the first anchor point and the second anchor point, each of the first and second parts of the resilient body comprises first and second beams, the first and second beams being separated by a spacing that decreases as the first and second beams extend toward the carrier body from the respective anchor point, each of the first and second parts of the resilient body being attached at a first end of the movable comb and permitting cantilevered, pivotal movement of the movable comb parallel to a plane defined by the comb fingers of the fixed comb in response to an actuating voltage applied to the combdrive, the comb fingers of the fixed and movable combs being curved in the direction of the movement.

23. The variable capacitor of claim 22, wherein, in a disengaged position, the combdrive comprises a space between the comb fingers of the movable comb and the comb fingers of the fixed comb.

24. The variable capacitor of claim 22, wherein the combdrive comprises a first combdrive, and further comprising a second combdrive that rotates the resilient body in a direction opposite the first combdrive.

25. The variable capacitor of claim 22, wherein the combdrive comprises a first combdrive, and further comprising at least one second combdrive that rotates the resilient body in the same direction as the first combdrive.

26. The variable capacitor of claim 22 connected in series or in parallel with a plurality of variable capacitors mounted to a common substrate.

27. The variable capacitor of claim 22, wherein the position of the movable comb and the capacitance of the combdrive are related to the actuating voltage applied to the combdrive.

28. An array of MEMS actuators mounted to a substrate, each MEMS actuator comprising:
a combdrive carried by a substrate, the combdrive having a fixed comb and a movable comb, each of the fixed comb and the movable comb having comb fingers, the fixed comb being immovably carried by the substrate;
a resilient body comprising a first part attached between a first anchor point on the substrate and a first side of the movable comb and a second part attached between a second anchor point and a second side of the movable comb, the first part extending toward the second anchor point relative to the first anchor point and the second part extends toward the first anchor point relative to the second anchor point such that the movable comb is supported by the resilient body between the first anchor point and the second anchor point, each of the first and second parts of the resilient body comprises first and second beams, the first and second beams being separated by a spacing that decreases as the first and second beams extend toward the movable comb from the respective anchor point, each of the first and second parts of the resilient body being attached at a first end of the movable comb and permitting cantilevered, pivotal movement of the movable comb parallel to a plane defined by the comb fingers of the fixed comb in response to an actuating voltage applied to the combdrive, the comb fingers of the fixed and movable combs being curved in the direction of the movement.

29. The array of MEMS actuators of claim 28, wherein the substrate comprises apertures for beams of light, the movable combs carrying shutters that control passage of light through the apertures.

30. The array of MEMS actuators of claim 29, wherein the substrate is a waveguide plate that emits light from a face of the waveguide plate, the face being parallel to a plane defined by the array of MEMS actuators and the shutters controlling passage of light that is traveling perpendicular to the plane.

31. The array of MEMS actuators of claim 28, wherein the actuating voltage comprises a periodic voltage having a frequency.

32. The MEMS actuator of claim 1, wherein the resilient body is symmetrical about the carrier body.

33. The MEMS actuator of claim 19, wherein the carrier body is symmetrical about the resilient body.

34. The variable capacitor of claim 22, wherein the resilient body is symmetrical about the carrier body.

35. The variable capacitor of claim 22, wherein the carrier body comprises a counter weight opposite the movable comb relative to the resilient body.

36. The variable capacitor of claim 35, wherein the carrier body is symmetrical about the resilient body.

37. The array of MEMS actuators of claim 28, wherein the movable comb is carried by a carrier body and the resilient body is symmetrical about the carrier body.

38. The array of MEMS actuators of claim 28, wherein the movable comb is carried by a carrier body and the carrier body comprises a counter weight opposite the movable comb relative to the resilient body.

39. The array of MEMS actuators of claim 38, wherein the carrier body is symmetrical about the resilient body.

* * * * *